(12) United States Patent
Chambers et al.

(10) Patent No.: US 7,743,012 B2
(45) Date of Patent: Jun. 22, 2010

(54) CONFIGURABLE CONTROLLING DEVICE AND ASSOCIATED CONFIGURATION UPLOAD AND DOWNLOAD SYSTEM AND METHOD

(75) Inventors: Christopher Alan Chambers, Stanton, CA (US); Han-Sheng Yuh, Diamond Bar, CA (US)

(73) Assignee: Universal Electronics Inc., Cypress, CA (US)

( * ) Notice: Subject to any disclaimer, the term of this patent is extended or adjusted under 35 U.S.C. 154(b) by 475 days.

(21) Appl. No.: 11/479,547

(22) Filed: Jun. 30, 2006

(65) Prior Publication Data

US 2006/0288300 A1 Dec. 21, 2006

Related U.S. Application Data

(63) Continuation-in-part of application No. 11/357,681, filed on Feb. 16, 2006, which is a continuation-in-part of application No. 11/218,900, filed on Sep. 2, 2005, now Pat. No. 7,266,777.

(60) Provisional application No. 60/705,926, filed on Aug. 5, 2005, provisional application No. 60/608,183, filed on Sep. 8, 2004.

(51) Int. Cl.
*G06F 17/30* (2006.01)
*G06F 7/00* (2006.01)

(52) U.S. Cl. .......................... 707/10; 707/770
(58) Field of Classification Search ........................ None
See application file for complete search history.

(56) References Cited

U.S. PATENT DOCUMENTS

| 5,555,369 A | 9/1996 | Menendez et al. |
| 5,602,993 A | 2/1997 | Stromberg |
| 5,909,545 A | 6/1999 | Frese, II et al. |
| 5,940,074 A | 8/1999 | Britt, Jr. et al. |
| 5,960,189 A | 9/1999 | Stupek et al. |
| 6,054,983 A | 4/2000 | Simonoff et al. |
| 6,151,606 A | 11/2000 | Mendez |
| 6,167,567 A | 12/2000 | Chiles et al. |
| 6,182,094 B1 | 1/2001 | Humpleman et al. |
| 6,211,870 B1 | 4/2001 | Foster |
| 6,308,283 B1 | 10/2001 | Galipeau et al. |
| 6,317,143 B1 | 11/2001 | Wugofski |

(Continued)

FOREIGN PATENT DOCUMENTS

WO 00/17738 3/2000

(Continued)

OTHER PUBLICATIONS

Office Action issued on Mar. 25, 2009 for U.S. Appl. No. 11/357,681.

*Primary Examiner*—Baoquoc N To
(74) *Attorney, Agent, or Firm*—Greenberg Traurig, LLP

(57) ABSTRACT

A configurable controlling device and associated editor program that allows a consumer to modify on a personal computer for downloading to the controlling device configuration data which is used to cause the controlling device to perform a function, such as to transmit a command to an appliance, to change the user interface page being displayed, etc. A central server facility is provided through which the managed exchange of configuration data between the editor program and remotely-located controlling devices may be performed.

4 Claims, 24 Drawing Sheets

U.S. PATENT DOCUMENTS

| | | |
|---|---|---|
| 6,437,836 B1 | 8/2002 | Huang et al. |
| 6,487,717 B1 * | 11/2002 | Brunemann et al. ......... 717/173 |
| 6,516,327 B1 | 2/2003 | Zondervan et al. |
| 6,587,067 B2 | 7/2003 | Darbee et al. |
| 6,654,771 B1 | 11/2003 | Parham et al. |
| 6,747,591 B1 | 6/2004 | Lilleness et al. |
| 6,751,794 B1 | 6/2004 | McCaleb et al. |
| RE38,598 E | 9/2004 | Frese, II et al. |
| 6,898,424 B2 | 5/2005 | Nishida |
| 6,909,378 B1 | 6/2005 | Lambrechts et al. |
| 6,989,763 B2 | 1/2006 | Wall et al. |
| 7,055,759 B2 * | 6/2006 | Wacker et al. ................ 236/51 |
| 7,218,243 B2 | 5/2007 | Hayes et al. |
| 7,266,777 B2 | 9/2007 | Scott et al. |
| 2001/0011953 A1 | 8/2001 | Shintani et al. |
| 2001/0042073 A1 | 11/2001 | Saether et al. |
| 2002/0063633 A1 | 5/2002 | Park |
| 2002/0063735 A1 | 5/2002 | Tamir et al. |
| 2002/0100036 A1 | 7/2002 | Moshir et al. |
| 2002/0143805 A1 | 10/2002 | Hayes et al. |
| 2002/0190956 A1 | 12/2002 | Klein et al. |
| 2002/0194314 A1 | 12/2002 | Kouznetsov et al. |
| 2002/0199025 A1 | 12/2002 | Kutay et al. |
| 2003/0028538 A1 | 2/2003 | Eikenbery |
| 2003/0095156 A1 | 5/2003 | Klein et al. |
| 2003/0103088 A1 | 6/2003 | Dresti et al. |
| 2003/0117427 A1 | 6/2003 | Haughawout et al. |
| 2003/0140120 A1 * | 7/2003 | Hartman ..................... 709/219 |
| 2003/0141987 A1 | 7/2003 | Hayes |
| 2003/0143991 A1 | 7/2003 | Minear et al. |
| 2003/0189509 A1 | 10/2003 | Hayes et al. |
| 2003/0237082 A1 | 12/2003 | Thurlow |
| 2004/0044454 A1 | 3/2004 | Ross et al. |
| 2004/0049771 A1 | 3/2004 | Yu |
| 2004/0100490 A1 | 5/2004 | Boston et al. |
| 2004/0103032 A1 | 5/2004 | Maggio |
| 2004/0107417 A1 | 6/2004 | Chia et al. |
| 2004/0133629 A1 | 7/2004 | Reynolds et al. |
| 2004/0235463 A1 * | 11/2004 | Patel ......................... 455/418 |
| 2005/0071749 A1 | 3/2005 | Goerke et al. |
| 2005/0256590 A1 | 11/2005 | Choi |
| 2006/0244625 A1 * | 11/2006 | Verdickt et al. ......... 340/825.22 |
| 2007/0155418 A1 * | 7/2007 | Shau et al. ................ 455/550.1 |
| 2007/0165555 A1 * | 7/2007 | Deng et al. ................. 370/318 |

FOREIGN PATENT DOCUMENTS

WO    WO 00/39772    7/2000

\* cited by examiner

| Description | Data Format | Name | Example | Count |
|---|---|---|---|---|
| Project XML File | XML | *ProjectName*.nevoproj | MyHouse.nevoproj | 1 |
| Sitemap XML File | XML | Sitemap.xml | | 1 |
| Page XML File | XML | p_*PageId*.xml | p_0001.xml | 1 per Page |
| Page Collection XML File | XML | pg_*PageCollectionId*.xml | pg_0001.xml | 1 per Page Collection |
| Device XML File | XML | dv_*DeviceId*.xml | dv_0001.xml | 1 per Device |
| NevoLink XML File | XML | bl_*NevoLinkId*.xml | bl_0001.xml | 1 per NevoLink |
| Media Zone XML File | XML | mz_*MediaZoneId*.xml | mz_0001.xml | 1 per MediaZone |
| Resources File | Binary | AllResources.resources | | 1 |

```xml
<ProjectSettings>
    <ResourceManagerInputDirectory>C:\Program Files\Nevo\NevoStudio\Gallery\Buttons\Activities</ResourceManagerInputDirectory>
    <Project identity>
        <Installer ID>RQ1981PDL2</Installer ID>
        <Client>Mr. Hayes</Client>
        <Target device MAC>00:0B:6C:24:A2:6C</Target device MAC>
        <Project revision>1.3</Project revision>
        <Revision date>20060109</Revision date>
    </Project identity>
    <HomePageId>4</HomePageId>
    <NevoSlDeviceSettings>
        <AcPowerScheme>
            <BacklightIdle>300</BacklightIdle>
            <Brightness>80</Brightness>
            <Suspend>600</Suspend>
            <SystemIdle>300</SystemIdle>
            <UserIdle>150</UserIdle>
            <WifiTimeout>600</WifiTimeout>
        </AcPowerScheme>
        <BatteryPowerScheme>
            <BacklightIdle>300</BacklightIdle>
            <Brightness>80</Brightness>
            <Suspend>600</Suspend>
            <SystemIdle>300</SystemIdle>
            <UserIdle>150</UserIdle>
            <WifiTimeout>600</WifiTimeout>
        </BatteryPowerScheme>
        <Password>R7MEUjX2v5g/mxdm</Password>
        <TimeDisplayFormat>0</TimeDisplayFormat>
        <EnableWIFI>True</EnableWIFI>
</ProjectSettings>
```

1502 (brace encompassing Project identity section)

```xml
<?xml version="1.0" encoding="utf-16" ?>
<SiteMap Version="1.0" Scale="0.5">
    <Node WidgetType="2" Widget="2" Location="450,200" Index="-1" Label="Home" Visible="False" />
    <Node WidgetType="1" Widget="4" Location="450,200" Index="-1" Label="Home Page" Collapsed="True" />
    <Node WidgetType="1" Widget="8" Location="620,200" Index="-1" Label="New Page 2" Collapsed="True" />
    <Node WidgetType="2" Widget="11" Location="450,699" Index="-1" Label="Sony TV" Collapsed="True" />
    <Node WidgetType="1" Widget="30" Index="-1" Label="HDTV STB Digits" Visible="False" Collapsed="True" />
    <Node WidgetType="1" Widget="44" Index="-1" Label="HDTV STB Setup" Visible="False" Collapsed="True" />
    <Node WidgetType="1" Widget="61" Index="-1" Label="HDTV STB Control" Visible="False" Collapsed="True" />
    <Node WidgetType="1" Widget="96" Index="-1" Label="Fastext" Visible="False" Collapsed="True" />
    <Node WidgetType="1" Widget="112" Index="-1" Label="HDTV STB Power" Visible="False" Collapsed="True" />
    <Link From="4" To="8" LinkType="1" />
    <Link From="30" To="44" LinkType="1" Visible="False" />
    <Link From="44" To="61" LinkType="1" Visible="False" />
    <Link From="61" To="96" LinkType="1" Visible="False" />
    <Link From="96" To="112" LinkType="1" Visible="False" />
</SiteMap>
```

```
<W STId="1" Id="30" Cn="HDTV STB Digits" Area="(0,25,240,295)" ShCap="T" FIUDF="F"
   FIC="-16777216" FIA="MC" FIN="Tahoma" FISz="8.25" FISy="0" FIFF="Tahoma" FIU="Point"
   SortOrder="10" InheritsBackground="F" InheritsFont="F" InheritsFunctionKeys="T"
   InheritsHardKeys="T" MasterPageId="1" PageGroupId="11" PageKeyGuideId="31"
   BackgroundInfoBackgroundType="ImageResource"
   BackgroundInfoColor="-1775639" BackgroundInfoImageResourceId="111">

. . . . .

<W STId="4" Id="37" Cn="5" Area="(88,83,64,31)" ShCap="T" FIUDF="F" FIC="-16777216"
   FIA="MC" FIN="Tahoma" FISz="8.25" FISy="0" FIFF="Tahoma" FIU="Point" BT="Button1Center"
   BTSz="M" SymCode="5" SIA="MC" ShSI="F" SymSize="M" SymBr="Light" NIId="116" PIId="117">
   <MDA>
       <A AI="IR.Send 117,5" AT="1" AS="117" AD="5" />
   </MDA>
   <MUA>
       <A AI="IR.Stop 117" AT="6" AS="117" AD="0" />
   </MUA>
</W>
```

FIGURE 17

CONFIGURABLE CONTROLLING DEVICE AND ASSOCIATED CONFIGURATION UPLOAD AND DOWNLOAD SYSTEM AND METHOD

RELATED APPLICATION INFORMATION

This application claims the benefit of and is a continuation-in-part of U.S. application Ser. No. 11/357,681 which in turn is a continuation-in-part of U.S. application Ser. No. 11/218,900 which in turn claims the benefit of U.S. Provisional Patent Application Nos. 60/608,183 filed on Sep. 8, 2004 and 60/705,926 filed on Aug. 5, 2005, all of which are incorporated herein by reference in their entirety.

BACKGROUND

The following relates generally to controlling devices and, more particularly, to a configurable controlling device having an associated editor program for use in configuring, among other things, the user interface of the controlling device as well as a system and method for distributing and maintaining a configured user interface.

Editor programs for configuring a controlling device, such as a hand held remote control, are known in the art. For example, U.S. Pat. No. 6,211,870 illustrates and describes a controlling device which is programmable from a PC using an advanced, object-oriented user interface. More particularly, multiple user selectable screen objects may be created on the PC and transferred to the controlling device. The screen objects include screen layout and descriptions of soft keys to be displayed on a graphic display of the controlling device, as well as commands associated with the screen object, the soft keys and/or programmable keys on the remote control unit. The user may then select any of the screen objects once they have been transferred to the controlling device to control the operation of various appliances.

Similarly, PCT published application no. WO 00/39772 discloses a universal, programmable remote control device which has programming that enables an end-user to customize the remote control device through editing or programming of the control functionalities of the remote control device. The programming is achieved via a PC. In this manner, the control configuration created via an editor on the PC can be downloaded into the device. It is additionally disclosed that the PC has emulator software to test the configuration before downloading. It is to be understood that WO 00/39772 generally discloses the editor for the Philips' "Pronto" remote control.

In the art there also exist online forums and user communities, such as prontoedit.com or remotecentral.com, which provide a means for consumers to exchange icons, program files, learned infrared codes, and/or general information concerning universal remote controls. It will be understood, however, that such online forums fail to provide for the exchange of data in a controlled and secure environment, or for the distribution of data in a targeted fashion.

Thus, while these known controlling devices and associated editor programs do work for their intended purpose, a need remains for an improved controlling device having an improved, associated editor program for use in configuring the controlling device. More particularly, a need exists for an editor program and associated configuration distribution facilities that allow a controlling device configuration which was previously installed on a remotely located controlling device to be conveniently retrieved and modified by the editor program, after which it may be re-installed on the original remotely-located configurable controlling device and/or shared amongst multiple users of compatible or like controlling devices, all in a managed and secure manner.

SUMMARY

In accordance with this and other needs, the following generally discloses an editor program for use in configuring a user interface of a controlling device, such as a hand-held remote control unit. The editor program allows a user on a personal computer to create, modify, upload from and download to a controlling device a graphical user interface comprised of user interface pages having icons which icons, when activated on the controlling device, cause the controlling device to perform a function, such as to transmit a command to an appliance, to change the user interface page being displayed, etc. The editor program advantageously provides, among other things, for the visualization of links created between user interface pages, single step assigning of commands to logical groups of function keys (both iconic and hard keys), single step assigning of backgrounds to groups of user interface pages, and pre-rendering of user interface pages prior to downloading of the user interface to the controlling device. In an exemplary embodiment, graphical user interface definition and configuration data may be uploaded from, modified, and then downloaded back to a remotely-located controlling device via a centrally located configuration distribution system in a managed and secure manner.

The various advantages, features, properties and relationships of this improved user interface editor and configuration distribution system will be obtained from the following detailed description and accompanying drawings which set forth illustrative embodiments which are indicative of the various ways in which the principles thereof may be employed.

BRIEF DESCRIPTION OF THE DRAWINGS

For use in better understanding the user interface editor and configuration distribution system and method described hereinafter reference may be had to the following drawings in which:

FIGS. 14 through 17 illustrate an exemplary container file and associated sets of data structures suitable for storing an editable GUI as a local file on a PC;

DETAILED DESCRIPTION

Figure 1:
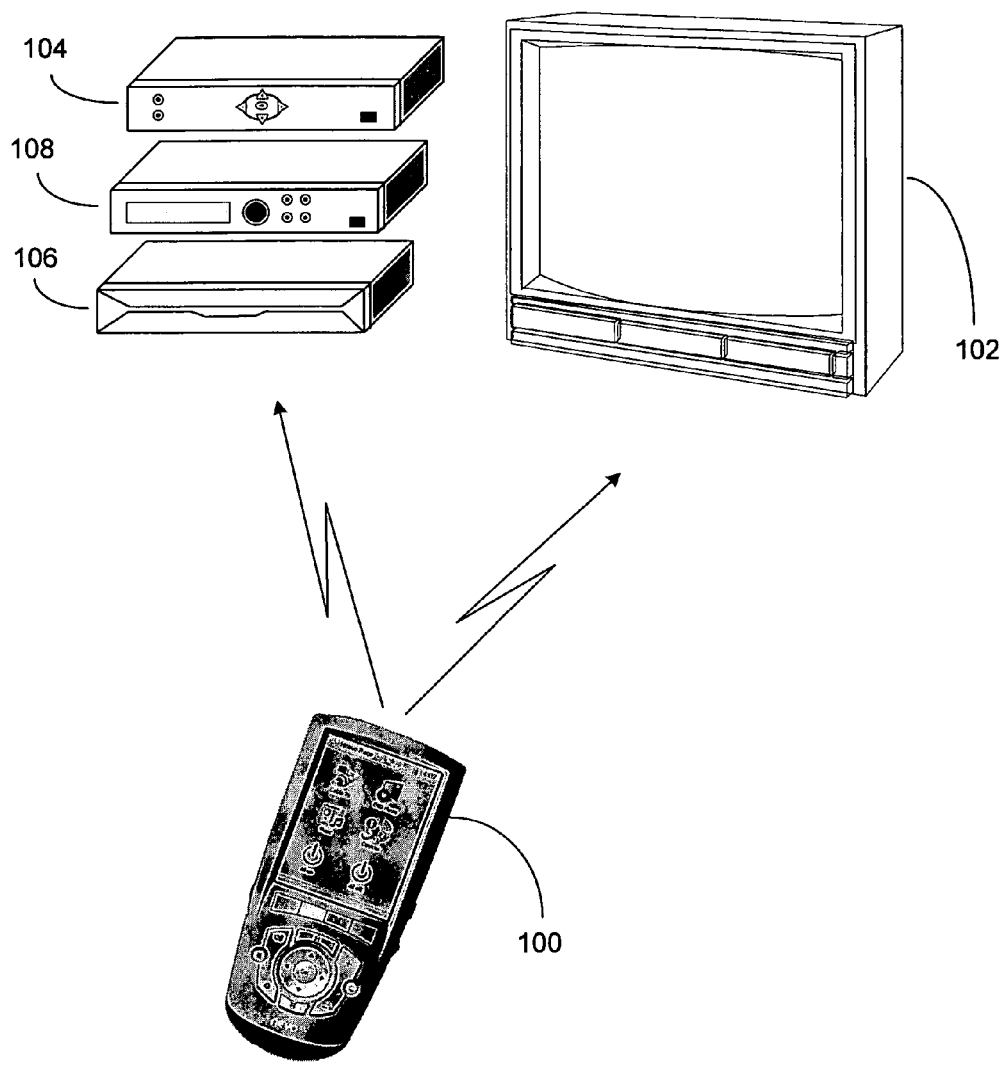
FIG. 1 illustrates an exemplary home entertainment system in which the exemplary controlling devices may be utilized.

The following discloses a controlling device having a face panel on which is carried a user interface activatable to cause transmission of at least one command to at least one appliance. Turning to the figures, wherein like reference numerals refer to like elements, FIG. 1 illustrates an exemplary system including controllable appliances, such as a set top box ("STB") 104, a DVD player 106, an audio amplifier/receiver 108 and a television 102, as well as a controlling device 100. The controlling device 100 is capable of transmitting commands to the appliances, using any convenient IR, RF, Point-to-Point, or networked protocol, to cause the appliances to perform operational functions. While illustrated in the context of a STB 104 with DVD player 106, audio system 108 and television 102, it is to be understood that controllable appliances can include, but are not limited to, televisions, VCRs, DVRs, DVD players, cable or satellite converter set-top boxes (STBs), amplifiers, CD players, game consoles, home lighting, drapery controls, fans, HVAC systems, thermostats, personal computers, etc., and, as such, the instant exemplary disclosures are not intended to be limiting as to type or quantity of controllable appliances or equipment.

Figure 2:
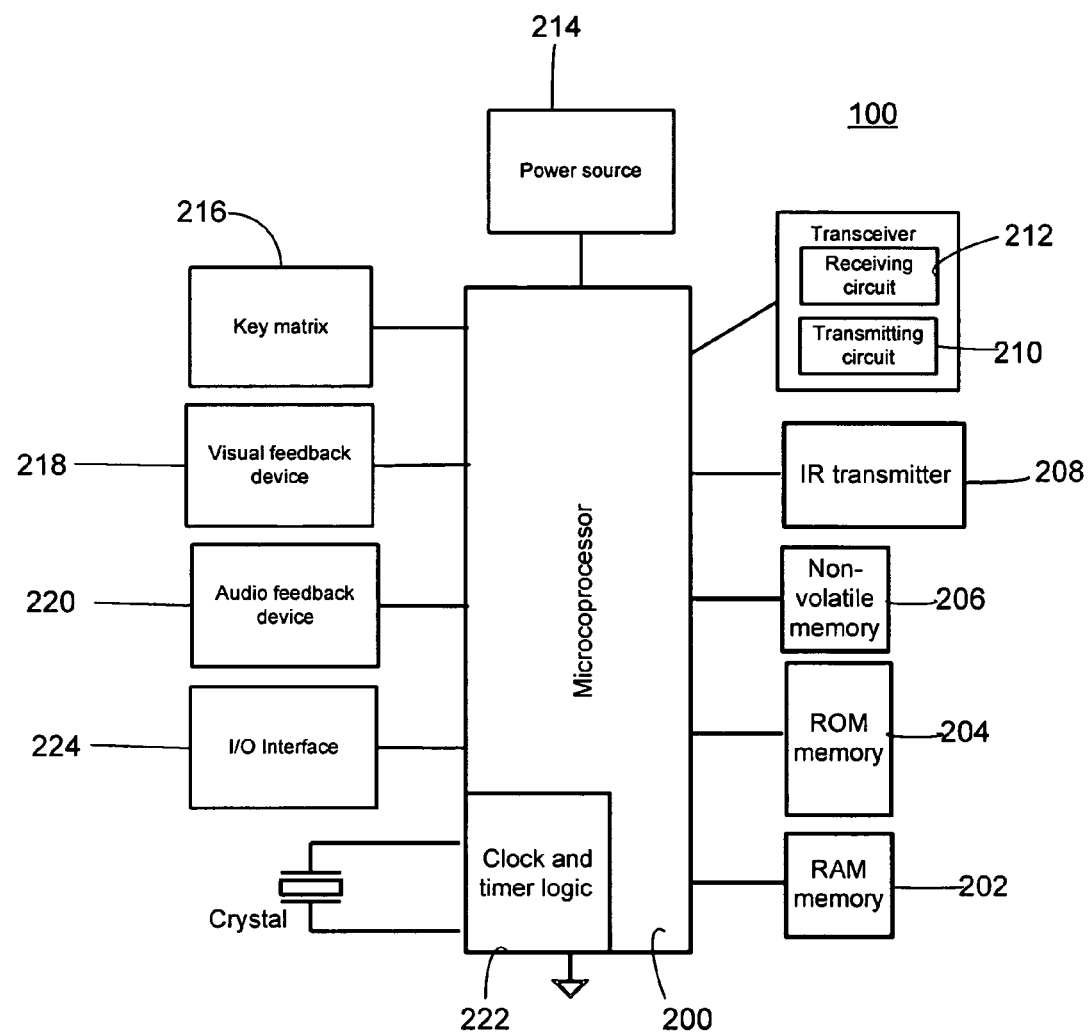
FIG. 2 illustrates a block diagram of components of an exemplary controlling device.

Turning now to FIG. 2, for use in transmitting command codes to one or more of the appliances, the controlling device 100 of the exemplary system may include, as needed for a particular application, a processor 200 coupled to a memory device (such as ROM memory 204, RAM memory 202, and/or a non-volatile memory 206), a key matrix 216 (e.g., physical buttons, a touch sensitive display with soft keys, or a combination thereof), an internal clock and timer 222, an IR (or RF) transmitter 208 for issuing commands to controlled appliances, RF (or IR) wireless transmission and reception circuit(s) 210, 212 and/or an physical input/output interface 224 for use in transferring data between the controlling device and external computing devices such as a PC, a network interface, etc., a means 218 to provide visual feedback to the user (e.g., LCD display or the like, which may underlay all or part of a touch sensitive portion of key matrix 216), a means 220 to provide audio feedback (speaker, buzzer, etc.) and a power supply 214 all as generally illustrated in FIG. 2. As will be understood by those of skill in the art, the memory device (s) may include executable instructions that are intended to be executed by the processor 200 to control the operation of the controlling device 100.

The non-volatile read/write memory 206, for example an EEPROM, battery-backed up RAM, Smart Card, memory stick, or the like, may be provided to store setup data and parameters as necessary. It is to be additionally understood that the memory devices may take the form of any type of readable media, such as, for example, ROM, RAM, SRAM, FLASH, EEPROM, Smart Card, memory stick, a chip, a hard disk, a magnetic disk, and/or an optical disk. Still further, it will be appreciated that some or all of the illustrated memory devices 202, 204, and 206 may be physically incorporated within the same IC chip as the microprocessor 200 (a so called "microcontroller") and, as such, they are shown separately in FIG. 2 only for the sake of clarity.

To cause the controlling device 100 to perform an action, the controlling device 100 is adapted to be responsive to events, such as a sensed user interaction with the key matrix 216, receipt of a data or signal transmission, etc. In response to an event appropriate instructions within the memory may be executed. For example, when a command key is activated on the controlling device 100, the controlling device 100 may retrieve a command code corresponding to the activated command key from memory 204 or 206 and transmit the command code to a device in a format recognizable by the device. It will be appreciated that the instructions within the memory can be used not only to cause the transmission of command codes and/or data to the appliances but also to perform local operations. While not limiting, other local operations that may be performed by the controlling device 100 include execution of pre-programmed macro command sequences, displaying information/data, manipulating the appearance of a graphical user interface presented on a local LCD display 218, etc. In this context, co-pending U.S. patent application Ser. No. 10/288,727 entitled "User Interface for a Hand Held Remote Control Device," which is hereby incorporated by reference in its entirety, provides further detail which will not be repeated herein for the sake of brevity.

For convenience and economy of development effort, the software programming of controlling device 100 may utilize an underlying operating system such as, for example, Microsoft's Windows CE product.

Figure 3A:
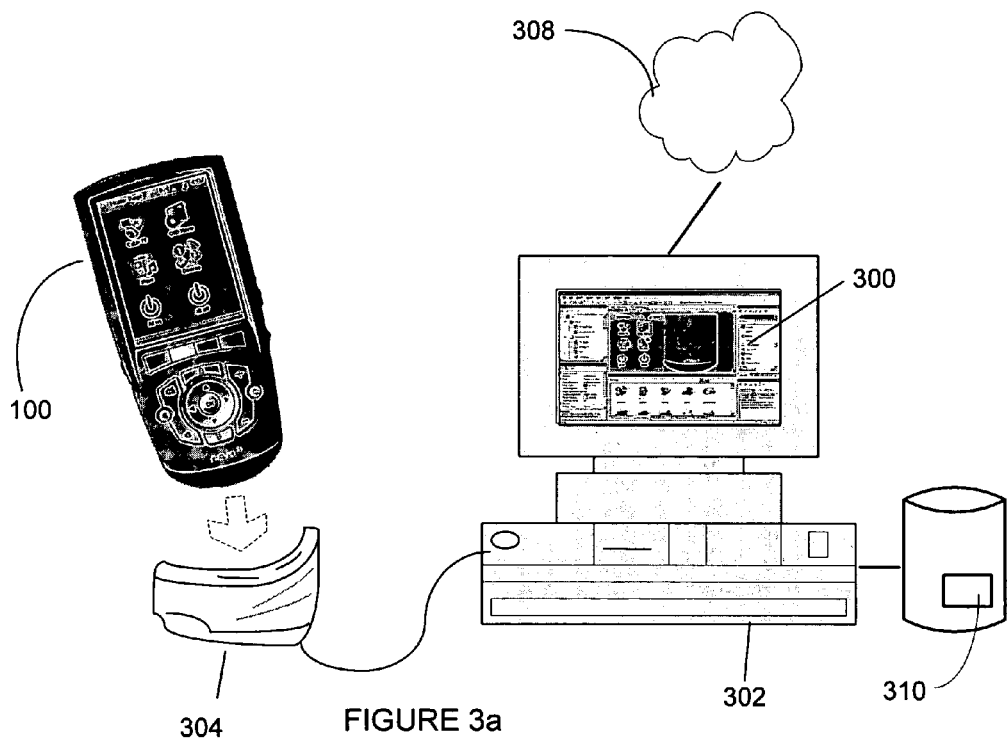
FIGS. 3a and 3b illustrates exemplary editing systems which may be used to configure and download the configuration, including a user interface, to an exemplary controlling device.
Figure 3B:
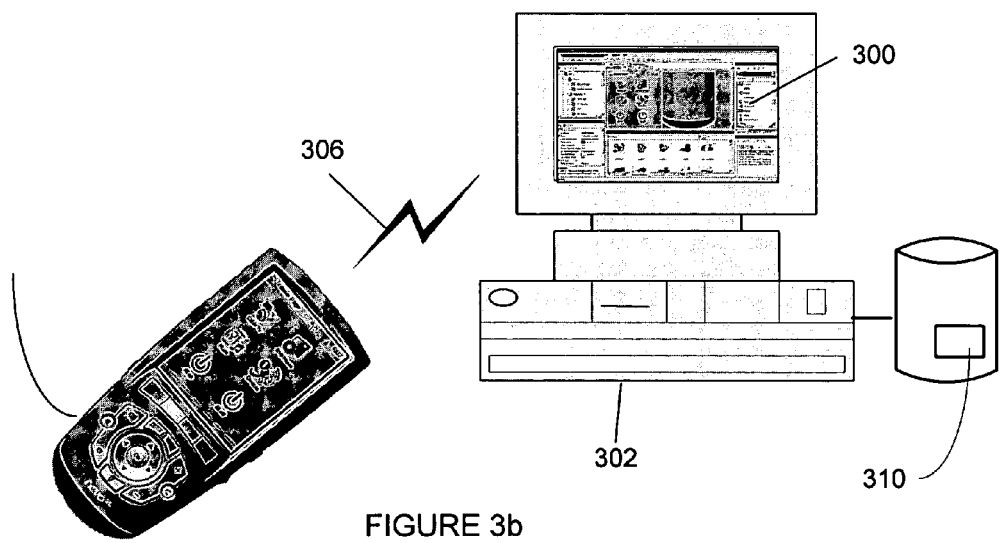
Figure 4:
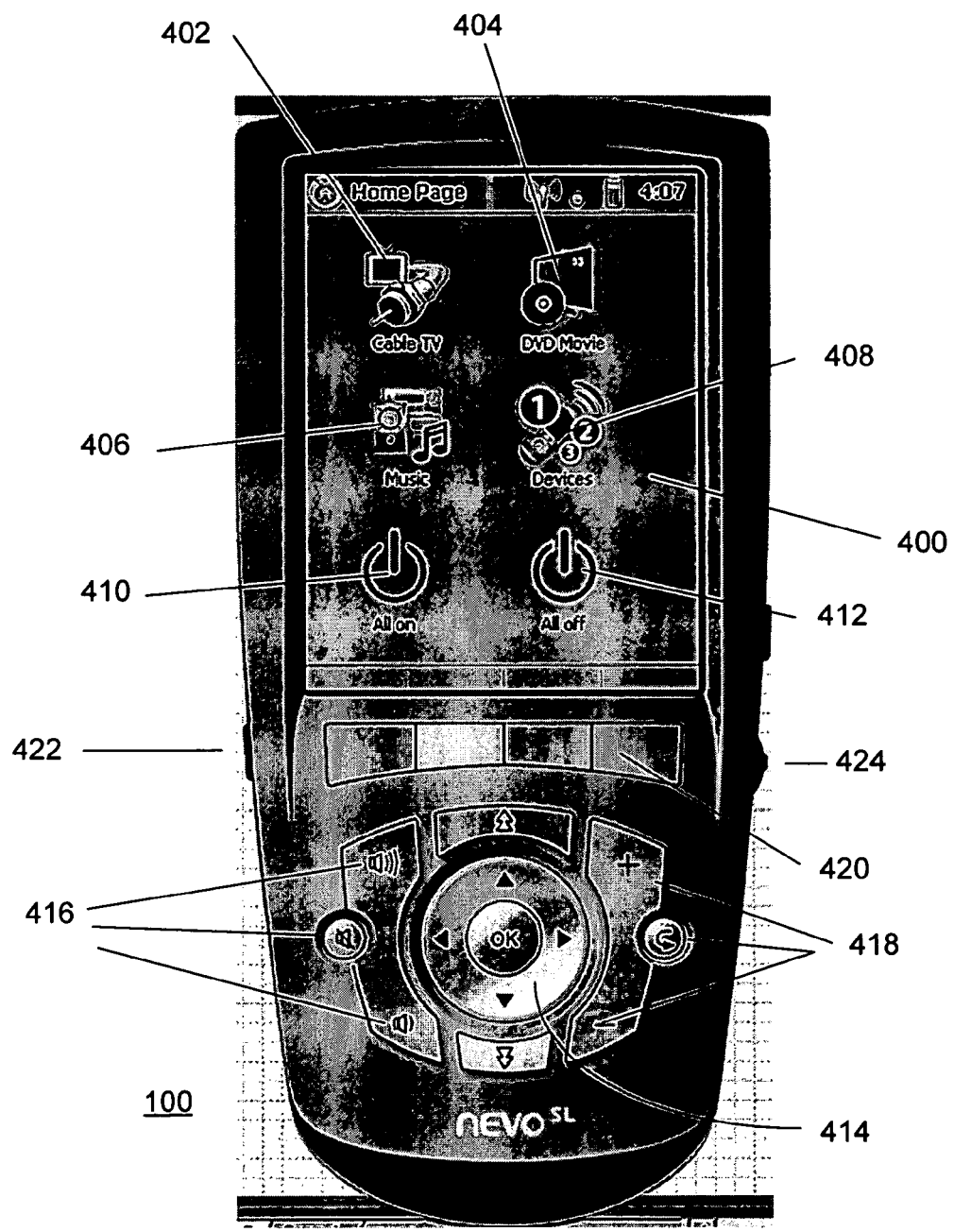
FIG. 4 illustrates an exemplary home page graphical user interface ("GUI") for the touch screen of a controlling device.

As contemplated in the above referenced and related U.S. patent application Ser. No. 11/218,900 and provisional applications 60/608,183 and 60/705,926, the graphical user interface ("GUI") and certain functionalities of controlling device 100 may be defined via a software based editing tool 300 which may be supplied as an application program to be installed on a PC 302 running an operating system, for example, Microsoft's Windows XP operating system, as generally illustrated in FIGS. 3a and 3b and described in further detail hereinafter. In the illustrative examples that follow, it will be appreciated by those skilled in the art that development tools such as Microsoft's Visual Studio, the C# programming language, and third party libraries such as, for example, those available from Syncfusion Inc. (Morrisville, N.C.) and Northwoods Software (Nashua, N.H.) may be used to facilitate creation of the software comprising exemplary editing tool 300 and exemplary controlling device 100 GUI and functionality. In particular, Microsoft's basic building blocks may be used to support networking, messaging (including operating system related messaging), graphic elements, printing, file access, Web services, etc., while Syncfusion's suite may provide enhanced widgets such as tree control, docking panels, drag and drop handlers, Microsoft Office 2003 look and feel controls, etc., and Northwoods' library may provide diagram control which, for example, allows nodes and connectors to be depicted on a virtual drawing surface.

Editor application 300 may be offered by the manufacturer of the controlling device 100 on a CD ROM, for download from a Web site, etc., as appropriate for installation on a PC of the user's choice. Once the editor application is installed on the user's PC 302, the controlling device GUI may be created or revised using the editor application, stored locally as a file 310 on PC 302 and/or caused to be downloaded into controlling device 100 via a hardwired docking station 304, a wireless link 306 (e.g., IEEE 802.11, Bluetooth, Zigbee, etc.) or any other convenient means. Additionally, it will be appreciated that the editor application 300, although primarily resident on the user's local PC 302, may also be adapted to access additional data items from remotely located servers via the Internet 308, from appliances linked to the PC 302 via a home network, etc. Examples of such items may include, without limitation, IR command codes (e.g., to allow for support of new appliances), data which indicates operations supported by an appliance, device model number cross-references (e.g., for entering into the controlling device for set-up purposes as disclosed in, for example, U.S. Pat. No. 6,587,067), operational software updates for controlling device 100, etc. It will also be appreciated that in such an environment data may also be uploaded from PC 302 to a centralized repository, e.g., a remotely located, Internet accessible server. Such uploaded information may include, for example, current user configurations, learned IR code data, etc., and may be comprised of or derived from data stored locally on PC 302 (for example, file 310) and/or data retrieved from controlling device 100 during the times controlling device 100 is coupled to PC 302.

Certain aspects of the operation of exemplary controlling device 100 will now be discussed in conjunction with FIGS. 4 through 8. In this context, as will be appreciated by those familiar with the relevant art and/or with the previously referenced parent and U.S. provisional applications, the actual appearance and functionality of all the GUI pages in controlling device 100 represent only one instance of the output of editor application 300. It will thus be understood that the GUIs and associated functionality presented herein are by way of example only and not intended to be limiting in any way.

Controlling device 100 may include both a touch activated LCD screen with soft keys (or other form of touch panel) and several groups of hard buttons 414, 416, 418. The hard buttons groups might comprise, for example, a volume control group 416 (e.g., volume up, down, and mute), a channel changing group 418 (e.g., channel up, down, and return), a navigation group embodied in a rocker disk 414 (e.g., for menu navigation and selection including up, down, left, right, and enter/select), and/or a row of programmable keys 420 (e.g., keys for supporting macros or other to-be-configured functions). Keys of the remote control having numerical labels (e.g., 0-9) may also be considered to be a logical group of keys that provide for digit entry operations.

Upon start of operation, or any time the "Home" button 422 (e.g., on the side of the device) is activated, an exemplary Home Page GUI 400 may be presented within the display. The illustrated, exemplary home Page 400 includes six touch-activated buttons. By way of example only, touching icon 402 may be used to initiate the activity of watching cable TV by causing controlling device 100 to transmit the commands required to power on cable STB 104, power on TV 102, select the TV input to which the cable STB is connected, and then cause the controlling device GUI to transition to the page (e.g., display having soft keys, an EPG, or the like) from which cable STB channel selection may be input (for further tuning, retrieving related content information, etc.). Touching icon 404 may be used to similarly cause the controlling device to place the entertainment system into a condition suitable for watching a DVD movie, while touching icon 406 may be used to cause the controlling device to place the system into a condition suitable for listening to music. Touching icon 410 and 412 may be used to cause the controlling device to power on or off all (or a subset) of the system devices, respectively. Touching icon 408 may be used to cause the controlling device to transition to another page 500 of the GUI, e.g., the GUI page illustrated in FIG. 5, from where individual device control pages may be called up, i.e., navigated to, using icons 502 (representing a cable STB), 504 (representing a TV), 506 (representing a DVR player) or 508 (representing an audio receiver). Examples of individual device control pages are shown in FIG. 6 (GUI page 600 having soft keys for use in controlling receiver input selection commands), FIG. 7 (GUI page 700 having soft keys for use in controlling DVD transport functions), and FIG. 8 (GUI page 800 having soft keys for controlling DVD slow motion controls). By way of further example of how GUI pages may be programmed to interrelate, activation of the "Slow" icon 702 in the DVD transport control page 700 (FIG. 7) not only will cause the controlling device to transmit a "slow" command to the DVD player but may also automatically cause the controlling device to transition the GUI to the DVD slow motion control page 800 (illustrated by way of example in FIG. 8) in connection with the transmitting of the command. Similarly, touching the "play" icon 802 of the DVD slow motion control page 800 may cause the controlling device to transmit the "resume normal speed playback" command to the DVD player while causing the controlling device to transition the GUI back to DVD transport controls page 700. In this way it will be understood and appreciated that a plurality of commands and/or actions may be performed both locally on controlling device 100 and remotely on the various appliances under the control of controlling device 100 in response to a single or multiple interaction(s) by a user with the key matrix 216 of controlling device 100.

Figure 9:
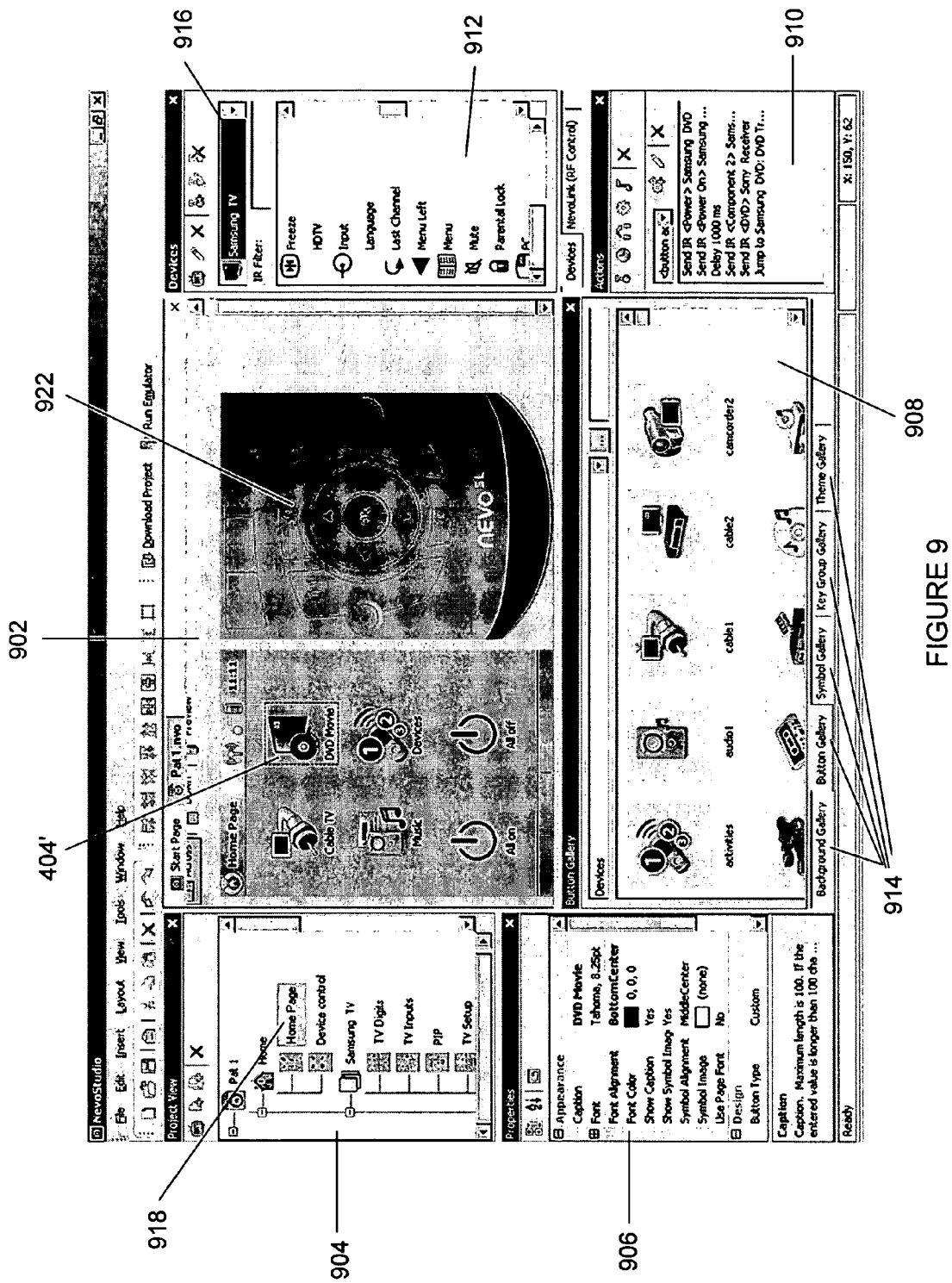
FIG. 9 illustrates an exemplary PC-based editor used to create the appearance and functionality of the GUI of FIG. 4.

Turning now to FIG. 9, the operation of the editing program 300 used to create the above-disclosed, exemplary GUI pages and associated functionality will be described in further detail. For this purpose, the PC screen display of the editor application may be divided into several windows or panels, each having a specific purpose. By way of example, the panels may be as follows:

Main project panel 902, used to display the current GUI page being edited (Home Page 400 in this example illustration) together with a representation 922 of the hard keys (e.g., keys 414 through 420) available on target controlling device 100.

Project View panel 904, used to display all currently defined GUI pages in a tree structure form (which may, as depicted in the exemplary embodiment shown, have collapse [−] and expand [+] functionality including selective expansion of individual nodes and/or a collapse all/expand all feature) where the GUI page to be edited may be selected (e.g., by clicking on a link) from within the tree structure list and wherein the GUI page being displayed in the Main project panel 902 may be indicated by a highlight 918 (the Home Page in the example illustrated).

Properties panel 906, used to display a list of (and allow editing of—for example by text entry, selection from drop down menus, etc.) the properties (such as the caption text and font attributes, symbol position, button type, etc.) associated with a presently selected GUI icon or hard key image within Main project panel 902 (GUI icon or soft key 404' with label "DVD Movie" in this illustration, as indicated by the highlight (dotted line) around icon 404' displayed in Main project panel 902).

Gallery panel 908, used to display graphic images which may be dragged and dropped onto the GUI pages being edited wherein the Gallery choices may include sets of icons for use as buttons, page backgrounds, symbols for labeling buttons, key groups (to allow a group of related key icons, e.g. a numeric pad, to be dragged into place in a single operation),or to allow pre-defined themes to be applied to single pages or groups of pages and wherein the Gallery in use (when multiple, organized Galleries are provided) is selected via tabs 914 according to the exemplary embodiment shown.

Actions panel 910, used to display a list of (and allow editing of—for example by dragging and dropping to change the order, by deleting selected items, etc.) the actions to be performed by controlling device 100 when the currently selected icon (in the Main panel 902) is activated by a user when the user interface is provided to the controlling device (e.g., in the example presented, it can be seen that activating the "DVD Movie" icon 404' will: (1) transmit a "Power On" command to DVD player 106, (2) transmit a "Power On" command to TV set 102, (3) wait one second for the devices to stabilize, then (4) transmit a "Component 2" input selection command to TV 102, (5) transmit "DVD" input selection command to Audio Receiver 108, and finally (6) jump to GUI page 700 corresponding to the DVD transport controls (illustrated in FIGS. 7 and 10).

Devices panel 912 is preferably used to display a listing of all remote control commands available for each of the appliances setup to be controlled by controlling device 100 wherein the list of commandable functions for a given appliance to be displayed may be selected from a drop down list 916 (which in the illustrative example would comprise a TV 102, a cable STB 104, a DVD player 106, and an audio receiver 108) and wherein the commandable functions so displayed may be assigned to any icon displayed in main project panel 902 by simply clicking and dragging a commandable function icon to, for example, a desired location with a listing of functions displayed in the Actions panel 910 and/or over an icon displayed in the Main panel (where it would be added, for example, to the top or bottom of the listing of commands within the Action panel display).

Figure 7:
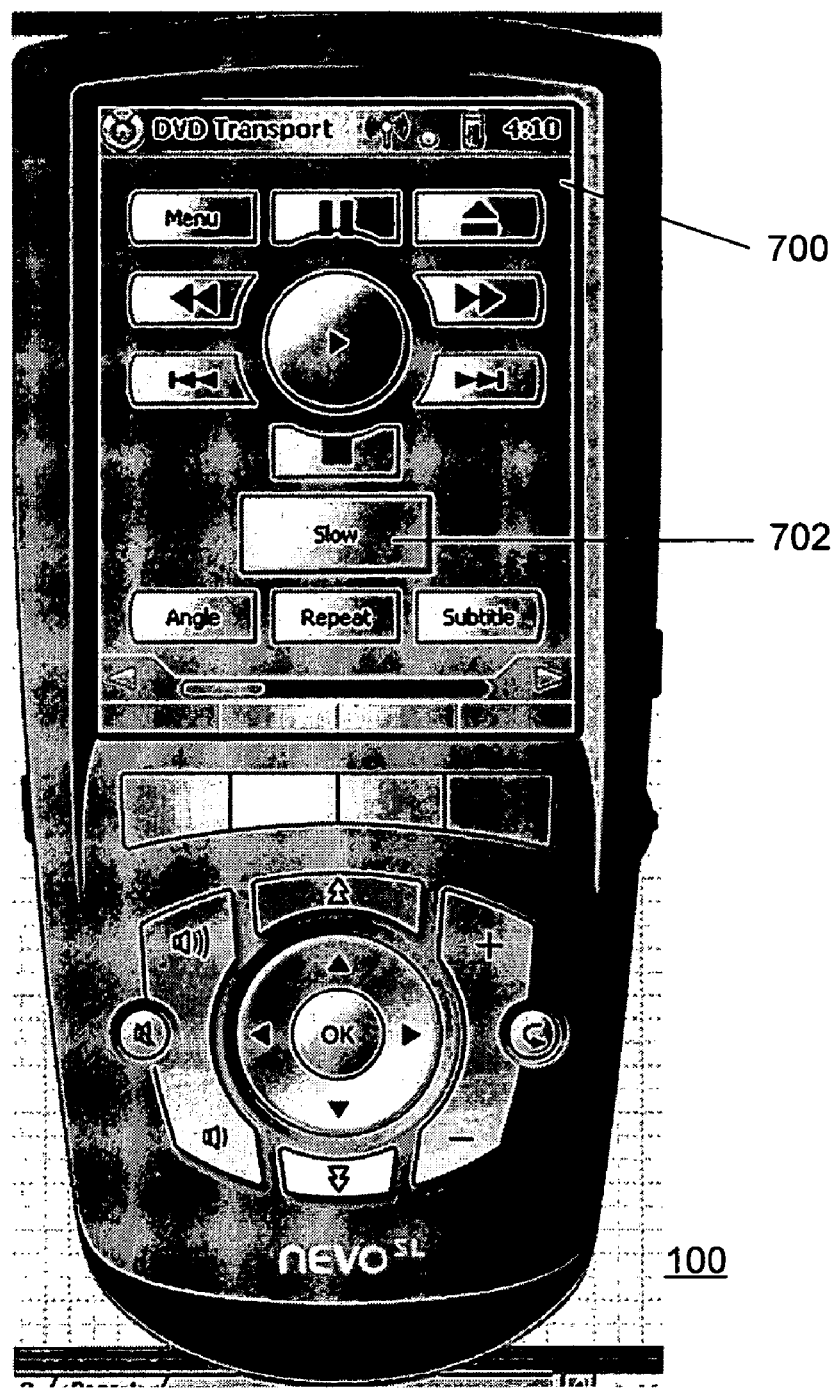
FIG. 7 illustrates another exemplary device control page GUI for the touch screen of a controlling device.
Figure 10:
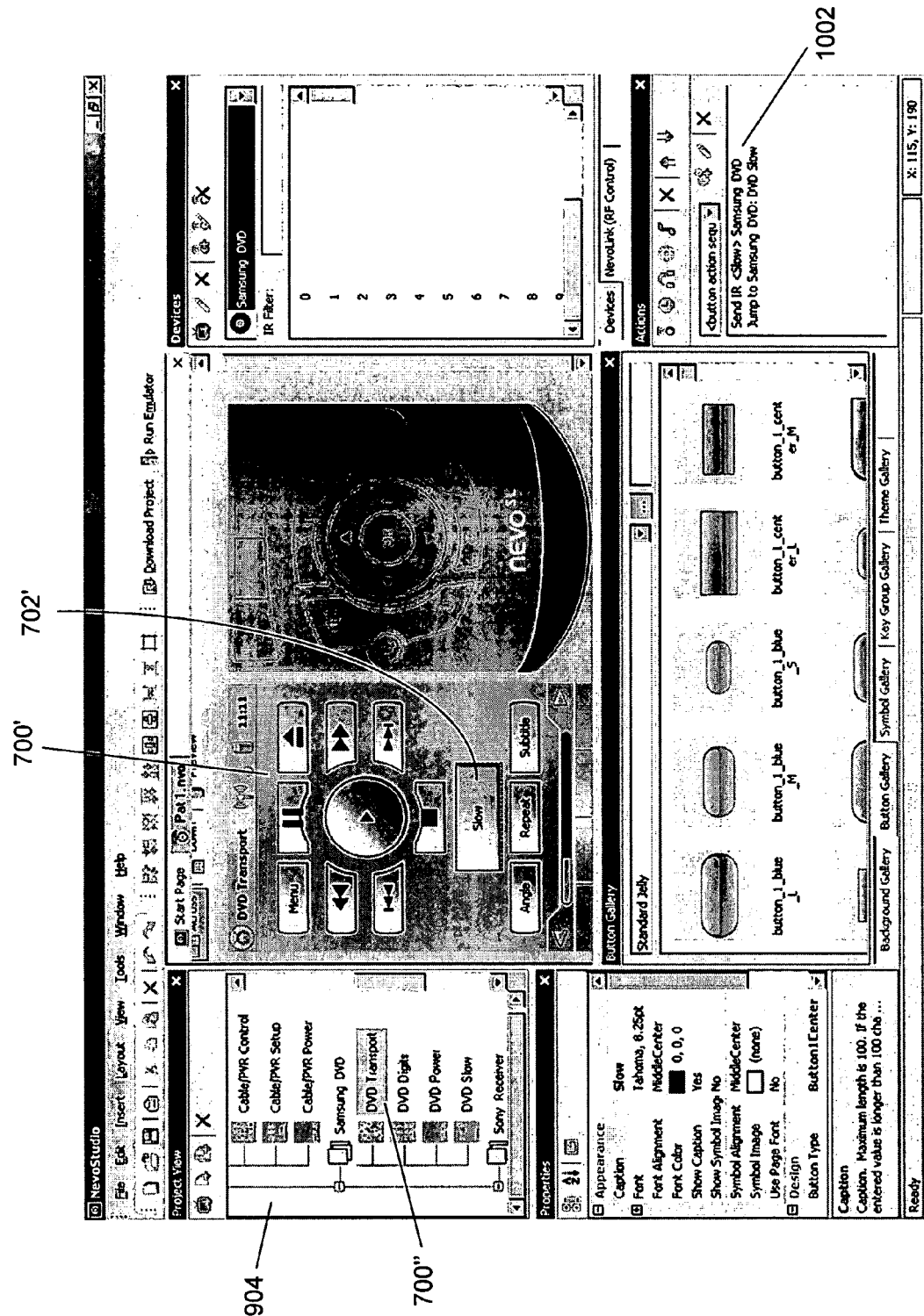
FIG. 10 illustrates an exemplary PC-based editor used to create the appearance and functionality of the GUI of FIG. 7.

Turning now to FIG. 10, wherein GUI page 700 has been loaded for editing by clicking on the appropriate entry icon 700" in the tree listing within Project View panel 904, it is seen that, in response to the selection of the "Slow" icon 702' in the Main panel, the Actions panel display 1002 shows a listing of the actions to be performed by the controlling device 100 when this icon is activated, i.e., transmit a "Slow" command to the DVD player and then jump to the DVD slow motion control page, as previously described in conjunction with FIG. 7.

Figure 8:
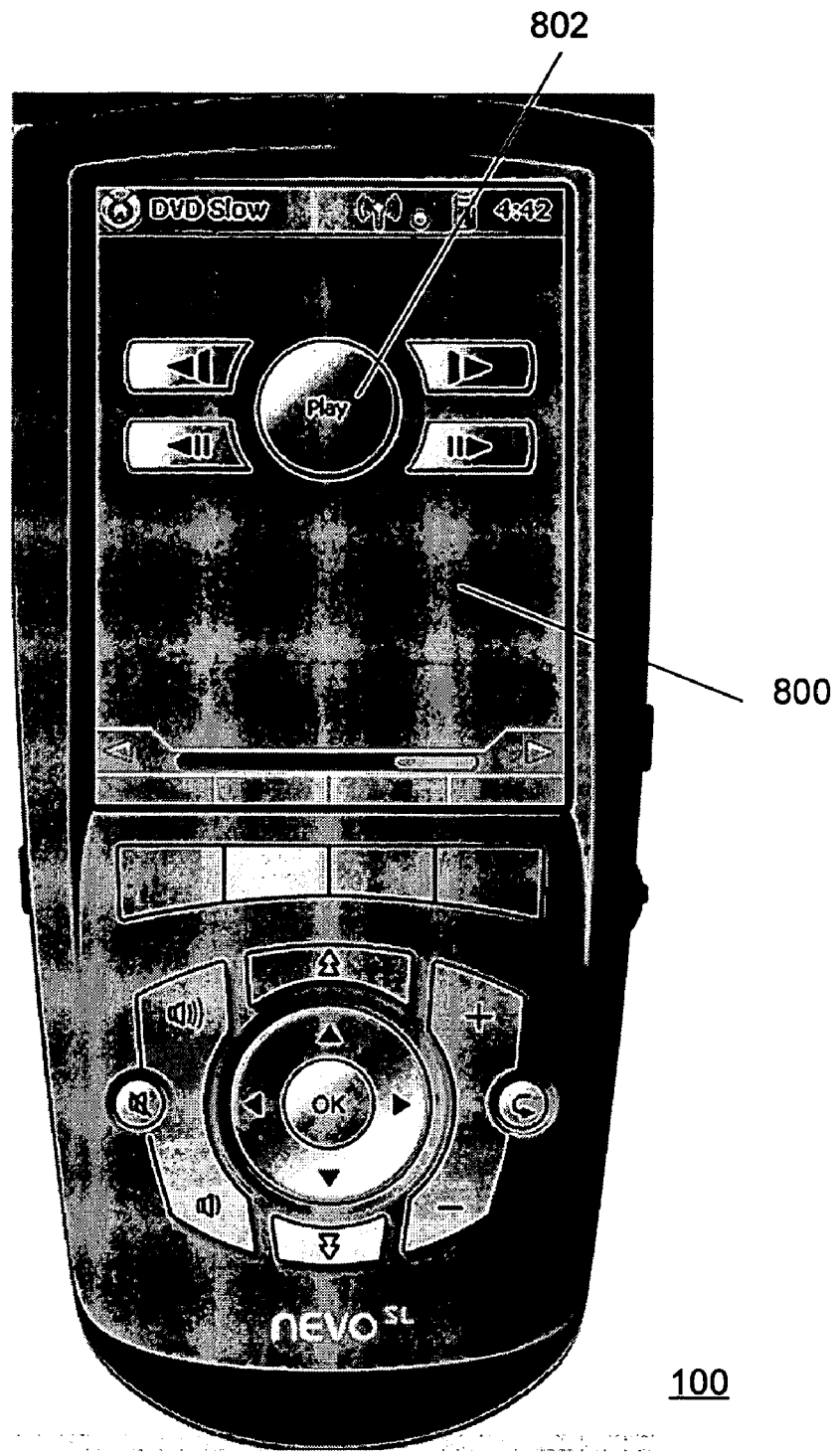
FIG. 8 illustrates yet another exemplary device control page GUI for the touch screen of a controlling device.
Figure 11:
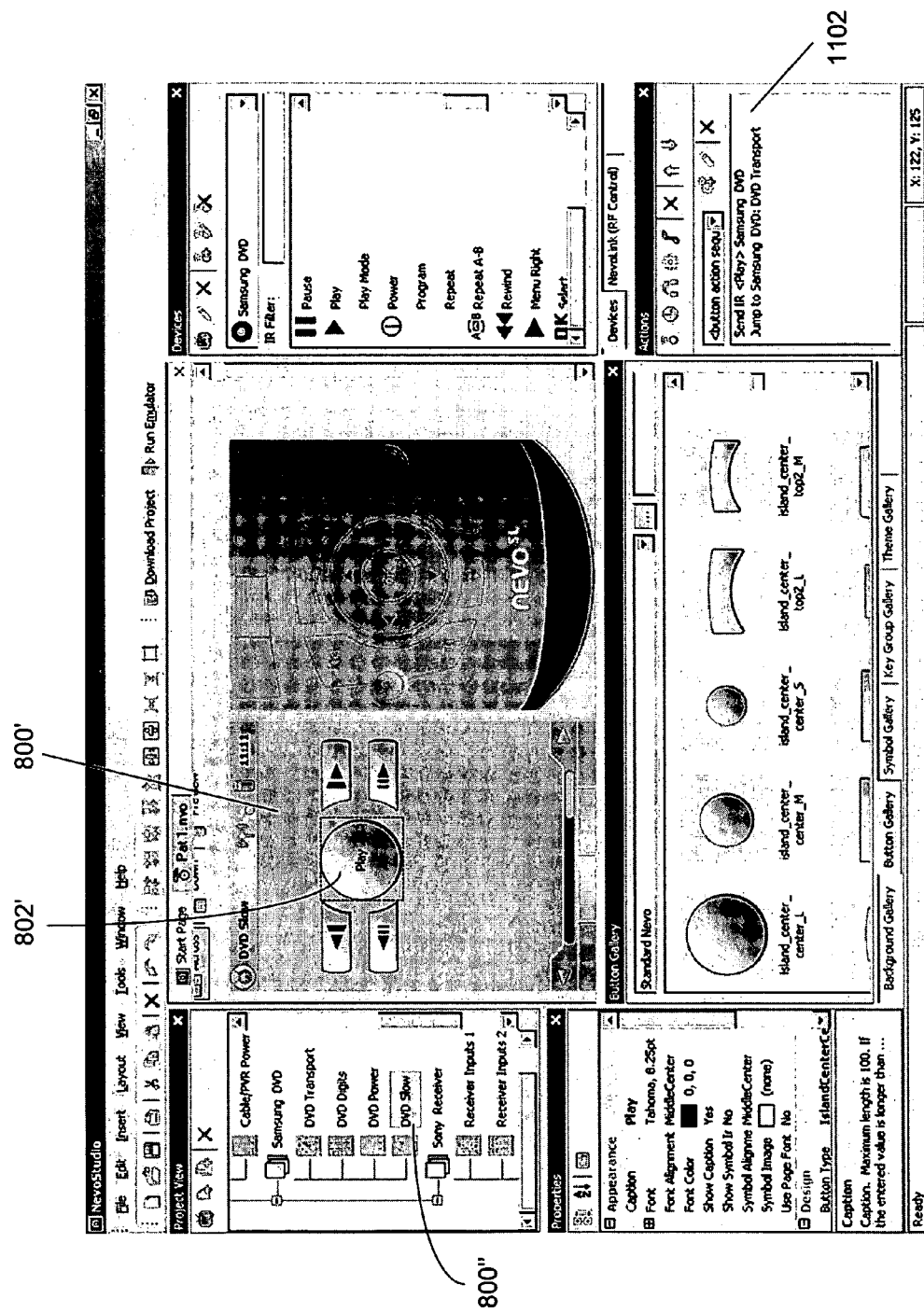
FIG. 11 illustrates an exemplary PC-based editor used to create the appearance and functionality of the GUI of FIG. 8.

Similarly, FIG. 11 illustrates a DVD slow motion control page 800' (instantiated in response to the selection of the "Samsung DVD"/"DVD slow" entry icon 800") and the actions to be performed by the controlling device 100 when the "Play" icon 802' is activated, i.e., transmit a "Resume normal speed play" command to the DVD player and jump to the DVD transport control page 700, as previously described in conjunction with FIG. 8. Again, the listing of functional commands 1102 is instantiated in response to the user selecting the "play" icon 802'.

Figure 5:
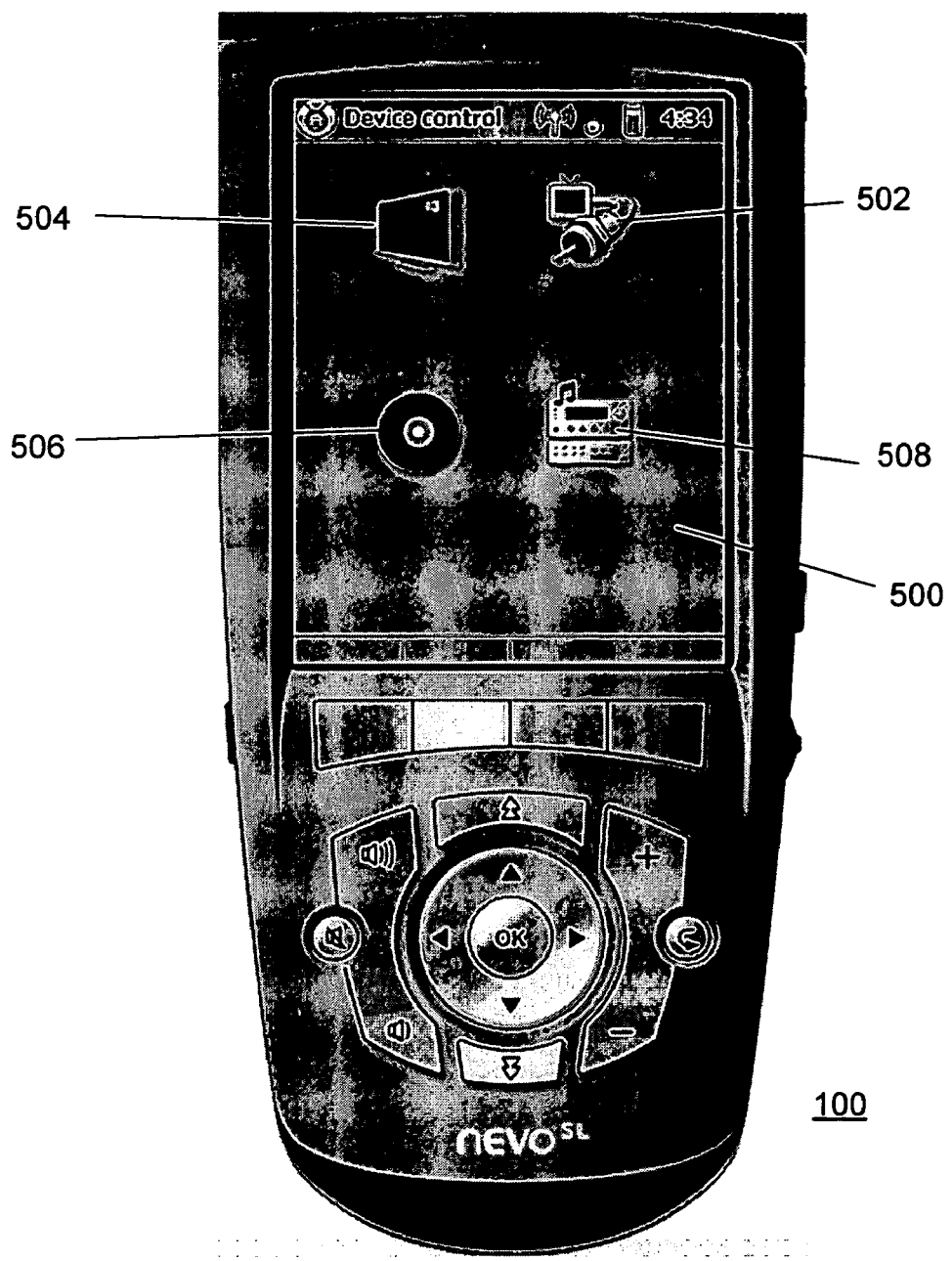
FIG. 5 illustrates an exemplary device selection page GUI for the touch screen of a controlling device.
Figure 6:
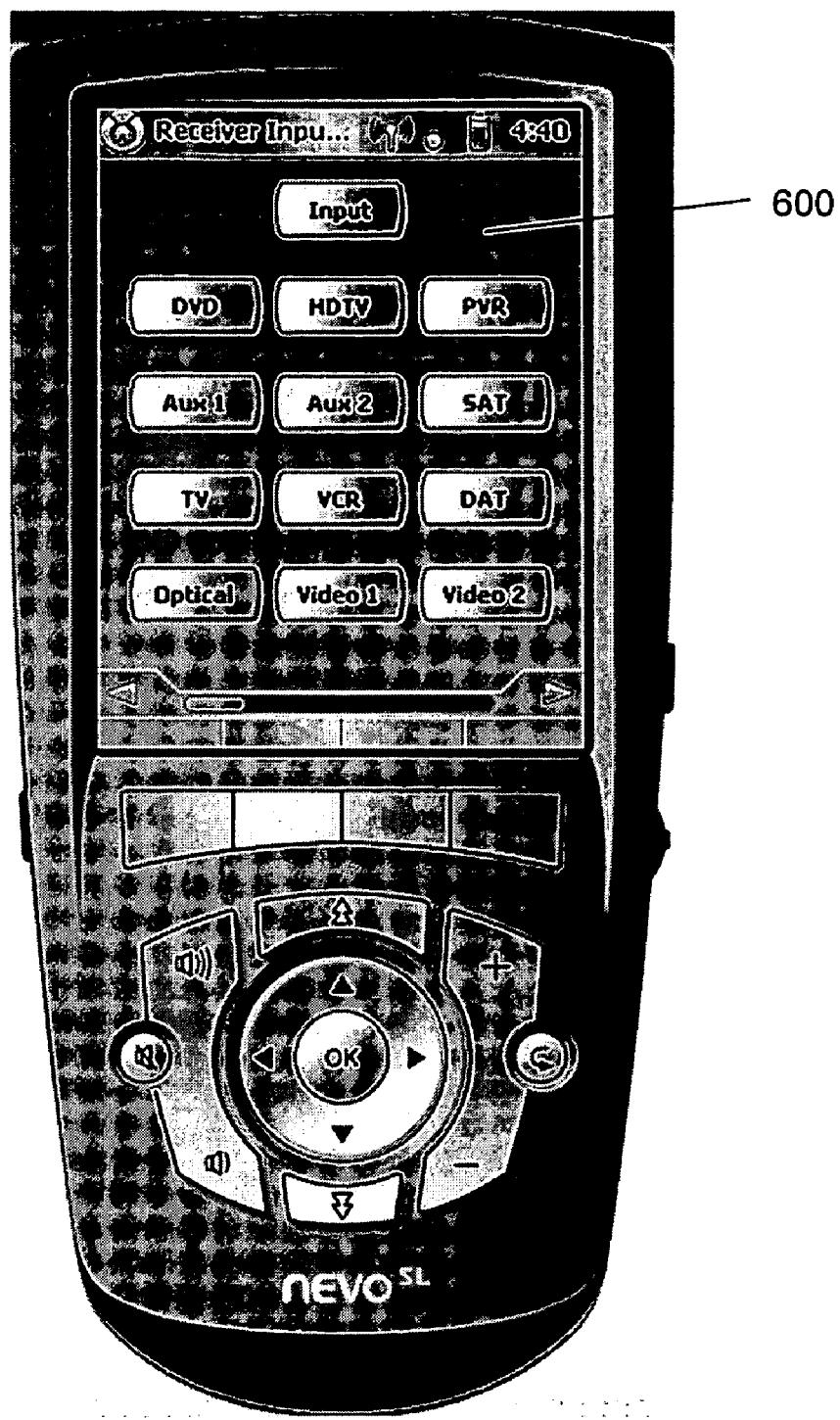
FIG. 6 illustrates an exemplary device control page GUI for the touch screen of a controlling device.
Figure 12:
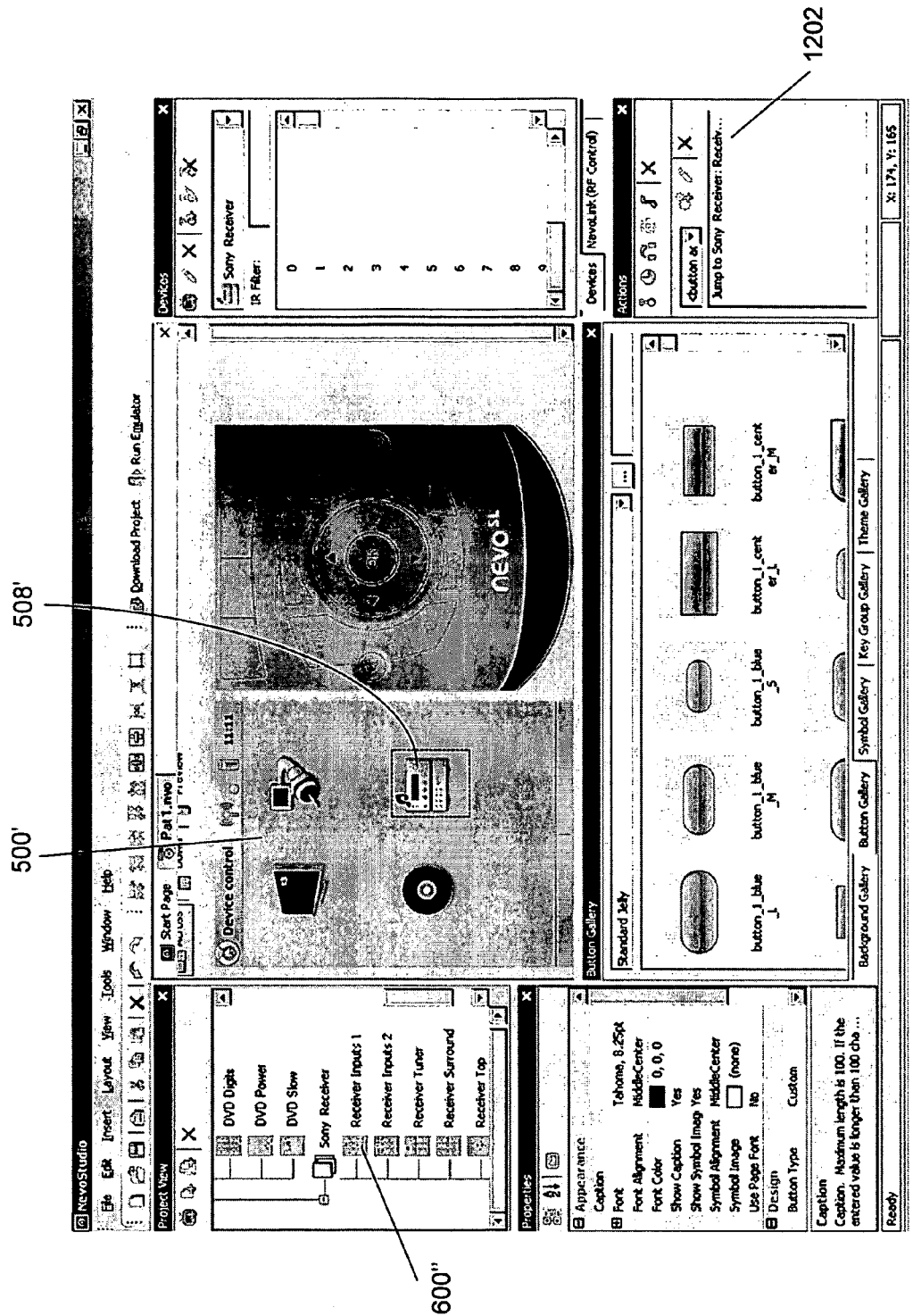
FIG. 12 illustrates an exemplary PC-based editor used to create the appearance and functionality of the GUI of FIG. 5.

FIG. 12 illustrates the editor representation of the devices GUI page of FIG. 5. As discussed, the icons on this page are used to jump directly to the individual device control page sets. As can be seen in Actions panel 1202, the exemplary selected icon 508' is programmed to send no commands, but rather to simply jump directly to the first page of the audio receiver page set 600", corresponding to FIG. 6 in the illustrated examples.

An exemplary set of data structures suitable for storing an editable GUI as a local file 310 on PC 302 will now be discussed. As will be appreciated by those of ordinary skill in the art, many other arrangements and data structures are feasible and accordingly those presented herein are intended to be way of example only, without limitation. Turning to FIG. 14, a top level listing of the exemplary contents of a GUI definition project file 310, corresponding to one editing project, is shown in tabular form. Such GUI definition project files may for example be stored on PC 302 as Microsoft Windows cabinet files (similar to the more commonly known zip archive file). As such, file 310 may comprise a container for other files. In the example presented, file 310 holds a number of XML files and a single resource file which together serve to define a controlling device GUI and its attributes.

Project definition file 1402 may comprise several sections, for example a ProjectSettings section 1500 (FIG. 15) which may contain system metadata and settings for controlling device 100, for example default backlight timeouts, display brightness, passwords, etc. The ProjectSettings section 1500 may also include a record of the location(s) from which various resources (button widgets, etc.) used in creating the GUI were drawn. Additionally, ProjectSettings section 1500 may include a project identity area 1502 holding data which identifies the author, revision, and target device for the project, this for use in managing and/or automating controlling device GUI updates as will be described further hereafter. Project definition file 1402 may further include sections such as, for example, a tabulation of global objects such as macros, an index listing of top-level objects, a manifest of all resources available, etc.

Sitemap file 1404, illustrated in FIG. 25, may contain data regarding nodes and edges used to construct a sitemap view of the GUI project (as described in the above referenced and related U.S. patent application Ser. No. 11/218,900).

The Page, Page Collection, Device, Nevo Link, and Media Zone files 1406 through 1414 each comprise an XML description of the corresponding object(s), and may, as appropriate for such object(s) be configured similarly. By way of example, a Page file 1406 will be described in further detail in conjunction with FIG. 17 wherein the root node 1700 of an exemplary typical XML Page file is illustrated. Page file root node 1700 may contain, for example, a page name 1702, data 1704 regarding the background image to be used for the page, information 1706 regarding properties inherited from other pages in the same group, etc. Also contained in exemplary root node 1700 may be a list of child nodes, one for each widget on the page, where a widget may be a button, key guide, etc. By way example, a button node 1710 may contain information regarding button image; label font, size, and placement; actions associated with the button, etc. It will also be noted that node 1710 includes child nodes 1712 and 1714 (MDA and MUA) which correspond to button down action and button up action respectively.

Finally, Resources file 1416 is a standard Microsoft Windows .NET resource file containing all the resources (images) used by the GUI project.

Figure 21:
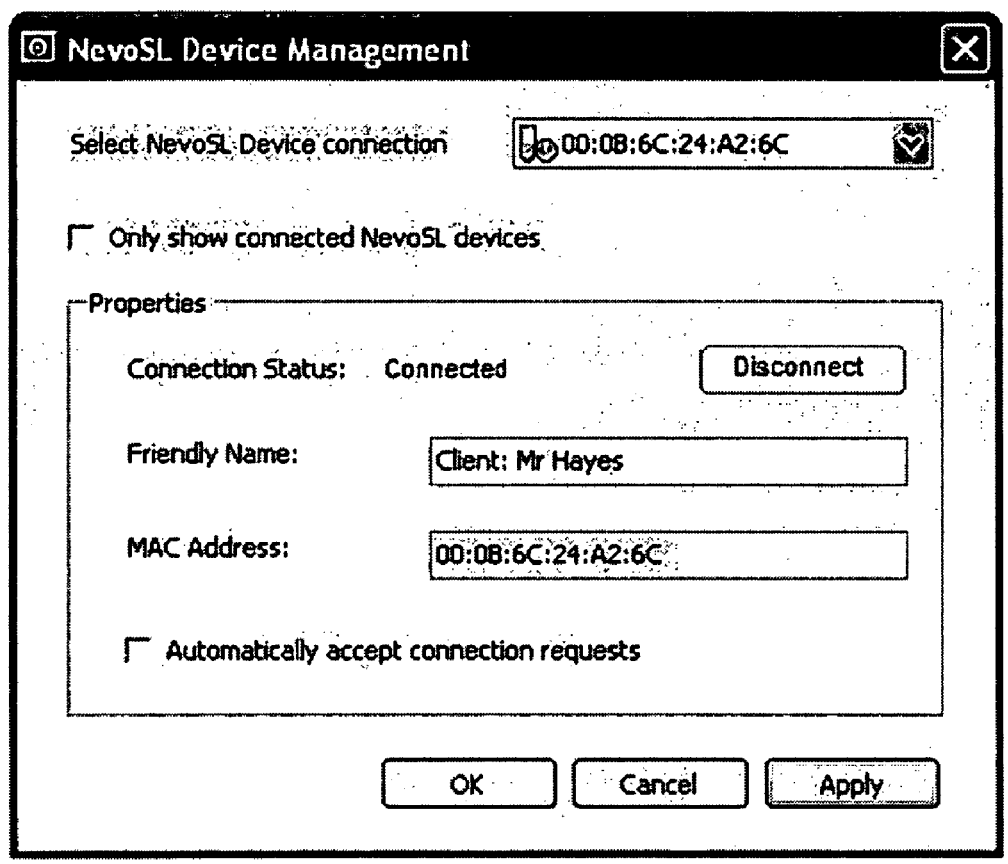
FIG. 21 illustrates an exemplary device identification display generated when a controlling device is connected to an editing system.

When a user of exemplary editor program 300 has completed creation and/or modification of a GUI configuration, the GUI configuration may be subsequently transferred to a controlling device 100 which has been physically placed into docking cradle 304. In this context it should be noted that every time a controlling device is docked with a PC system, editor program 300 may check the MAC (Media Access Control) address of the controlling device hardware against a table of MAC addresses of known (i.e., previously docked) devices. If it is determined that this is the first time this particular controlling device has been interfaced with this system, a dialog box (illustrated in FIG. 21) is preferably instantiated which allows the user of editor program 300 to enter additional identifying data regarding this device. Such data may then be available for subsequent use, for example, to populate certain fields in project identity area 1502.

Turning again to FIG. 13, transfer of a new or modified configuration and GUI to a docked controlling device may, for example, be initiated by clicking tab 1304 of drop-down menu 1300, causing editor program 300 to download a representation of the contents of the new or updated project file 310 into controlling device 100 via a wired connection using a connection protocol such as USB, RS232 serial, etc. In certain embodiments, a shortcut tab 1302 may also be provided as an alternative method of initiating download. In other embodiments tabs 1308,1310 may be provided for downloading to or uploading from a remotely located controlling device, as will be described in further detail hereafter. Prior to downloading, in certain embodiments editor program 300 may pre-process certain elements of the project file 310 data into a data structure 311 which may be in a format more suitable for direct use within controlling device 100, as described in greater detail in previously referenced U.S. patent application Ser. No. 11/218,900 of which this is application is a continuation-in-part. In other embodiments, such pre-processing may be minimized in order to ensure that a data structure 311 retrieved from a controlling device may be equivalent to project file 310, or at least sufficient to enable re-creation the contents of project file 310, thereby permitting modification and re-installation of the GUI, codes, and other device settings, as described in further detail hereafter.

In either embodiment, it may be desirable to transfer configuration data structure 311 to and from a controlling device 100 via a wireless link 306 such as for example WiFi (IEEE 802.11x), Bluetooth, etc. In this case and in certain embodiments it may be preferable for the transfer process to be initiated from controlling device 100 rather than from the PC-based editor program 300. To this end, controlling device 100 may be provided with a selectable option under its "Settings" menu titled, for example, "Connect."

Figure 18:
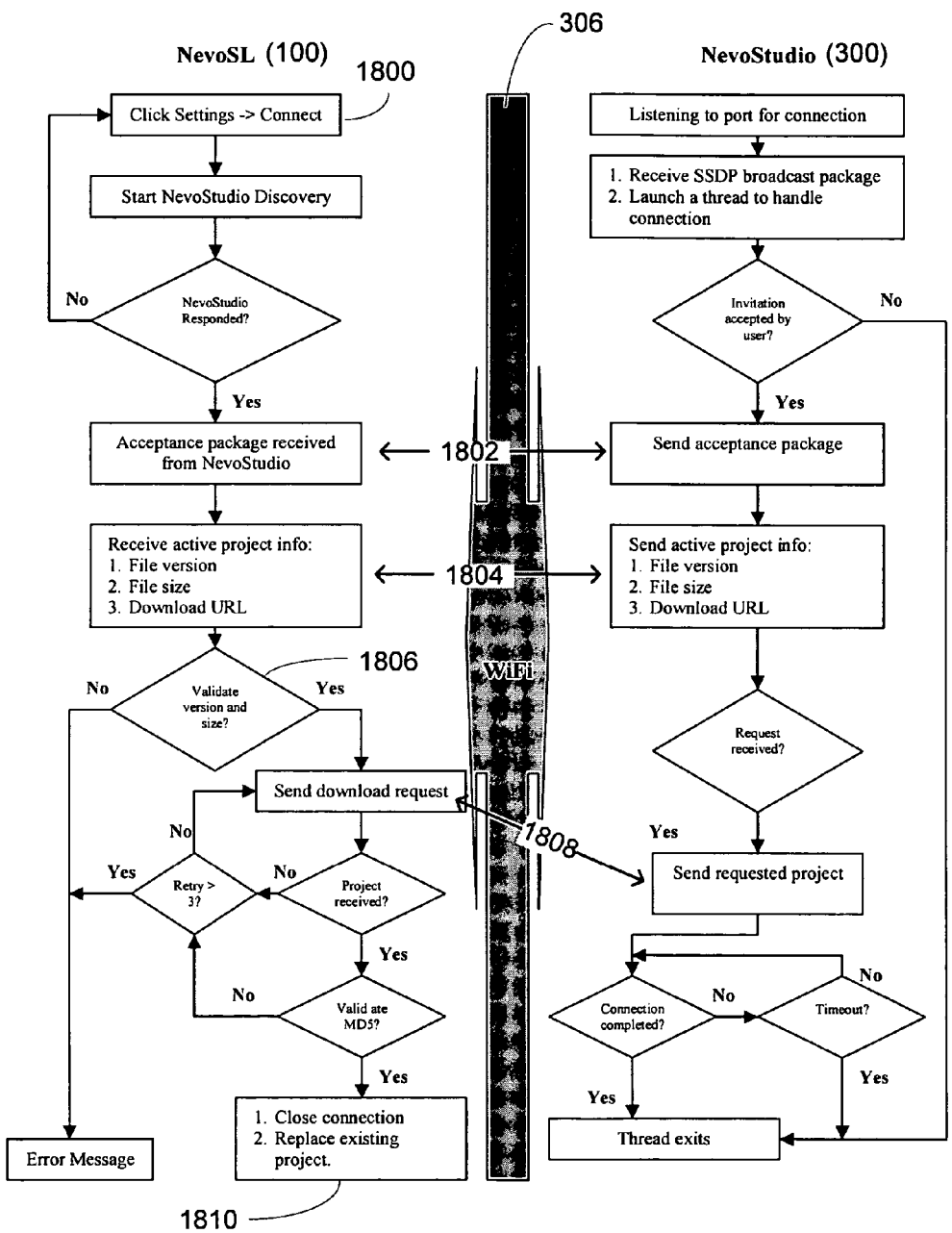
FIG. 18 illustrates an exemplary method of downloading project files created using the PC-based editor to the controlling device over a wireless link.

In the method of an exemplary embodiment illustrated in FIG. 18, user activation of the "Connect" option 1800 may cause a controlling device 100 to initiate a wireless discovery process using for example SSDP (Simple Service Discovery Protocol) to seek any appropriately configured PC based editor program 300 within the applicable wireless communication range of controlling device 100. If one is found, a connection may then be established and information exchanged 1802,1804 which serves to identify to the controlling device which, if any, of the active project files 310 stored on PC 302 may be applicable. In this context an active project file may comprise the one most recently edited, all files edited within a specified period of time, all those which have not previously been downloaded, only files located in a particular directory, etc., as appropriate. If the controlling device makes a determination 1806 that an updated version of a project file exists, the download process 1808 is initiated. Upon completion of the download process and, optionally, after validation of any check data, the new configuration is installed 1810 and the connection between the devices is preferably closed. In the illustrated exemplary embodiment MD5 (Message-Digest algorithm 5), a well known cryptographic hash function, is used to generate a 128-bit checksum to validate the integrity of the downloaded file, though it will be appreciated that many other methods are possible. It will also be appreciated that while this process is manually initiated via a "Download" selection in the above exemplary embodiment, as an alternative it may be automatically initiated on a periodic basis, either by user option or as a standard feature.

Figure 19:
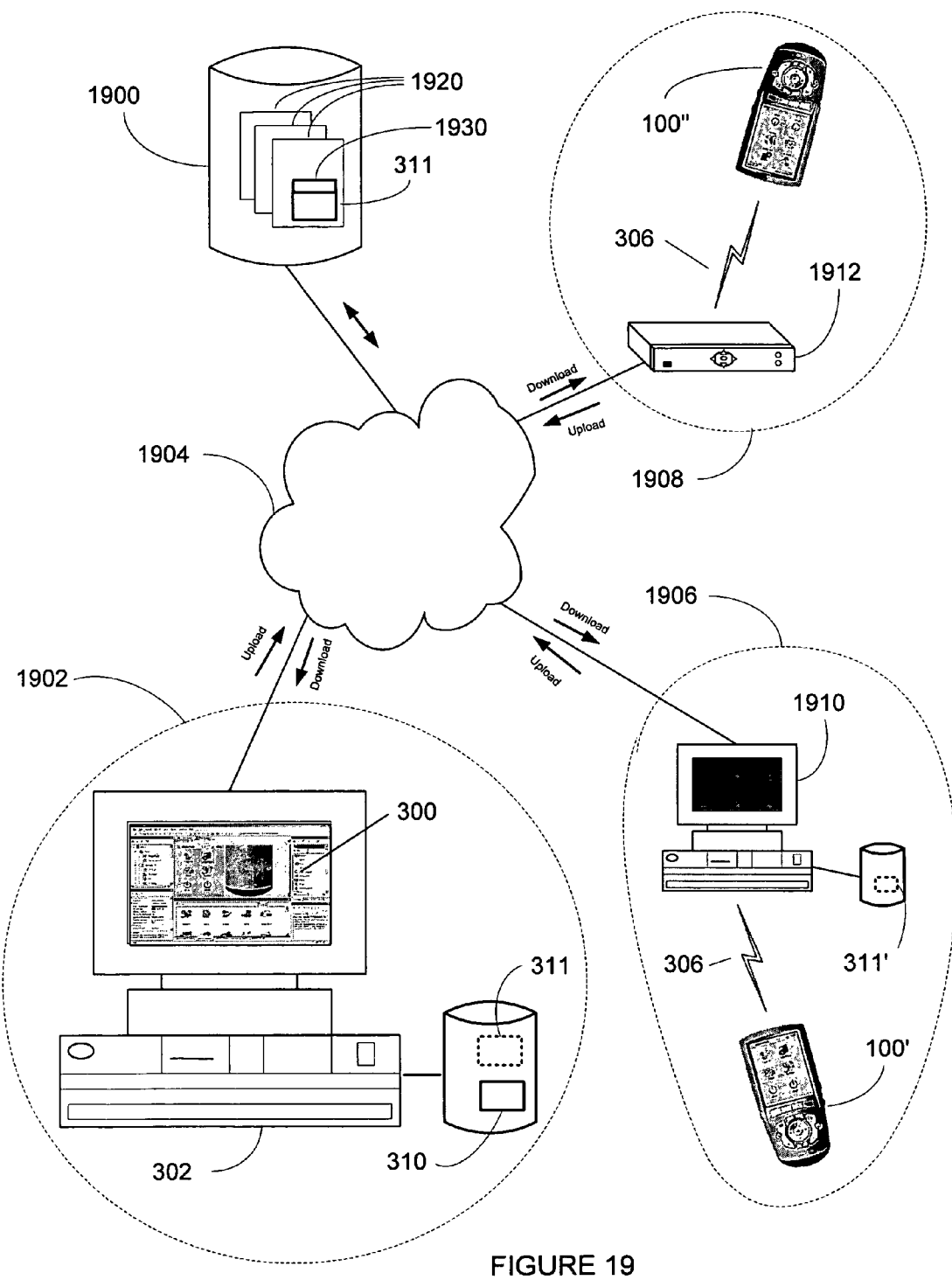
FIG. 19 illustrates an exemplary system in which project files may be exchanged between an editing system and controlling devices at other locations, via a central server.

Turning now to FIG. 19, in certain applications where, for example, a controlling device GUI has been designed and configured for a consumer by a third party, such as a professional installer performing a turnkey installation of a home theater system, it may be advantageous if a controlling device configuration in need of future updating could be edited at a location which is remote from the consumer's system (e.g., the installer's office) and subsequently downloaded to the consumer's controlling device(s) via the Internet, PSTN (including both LAN-line and wireless telephony networks), or other convenient data communication means. To this end a centralized sharing service 1900 may be provided, for example by the manufacturer of the controlling device, to facilitate such a feature. A project file 310 corresponding to a controlling device configuration and graphical user interface may be created or modified at one site 1902 and uploaded, in the form of a data structure 311 suitable for use by a controlling device 100, to a central server 1900 via Internet 1904 (or other suitable communication means) where it may be stored together with indicia 1930 identifying the origin, target (e.g., client ID), and version of the uploaded data. Other controlling devices 100', 100" at locations 1906, 1908 may then periodically check the central server 1900 for revised configuration data with indicia that matches the origin of their currently installed GUI and configuration, and if a later revision is found, download the revised data structure(s) 311 and update themselves accordingly. Controlling devices may communicate with server 1900 using a PC 1910 or other device 1912 as a gateway to the Internet, PSTN, etc., (collectively, "gateways.") In one embodiment local communication between a controlling device and a gateway may be wireless using WiFi (IEEE 802.11), Bluetooth, Zigbee, or any other suitable protocol. In an alternative embodiment data structure 311' may be temporarily downloaded to a users's PC and subsequently transferred to a docked controlling device via a wired connection in a manner similar to that described earlier. In yet another alternative embodiment data structure 311 may be downloaded directly to an appropriate configured controlling device via a mobile PSTN (e.g., GSM, CDMA, and the like).

To facilitate modification of previously-installed GUIs, server 1900 may permit an installer to activate (from editing location 1902) an upload request for a particular client device, for example illustrated controlling device 100' at location 1906. This upload request may be stored as part of indicia data 1930 such that when the target controlling device 100' next periodically checks with central server 1900 (by user command or automatically, depending on embodiment and/or configuration) device 100' is instructed to upload its currently installed configuration data structure to server 1900. Uploaded configuration data structure 311 may then be transferred back to editing system 302 for conversion into a project file 310 (if necessary) and modification using editor application 300. The modified controlling device GUI may then be transferred back to controlling device 100' using any of the methods previously described.

Figure 13:
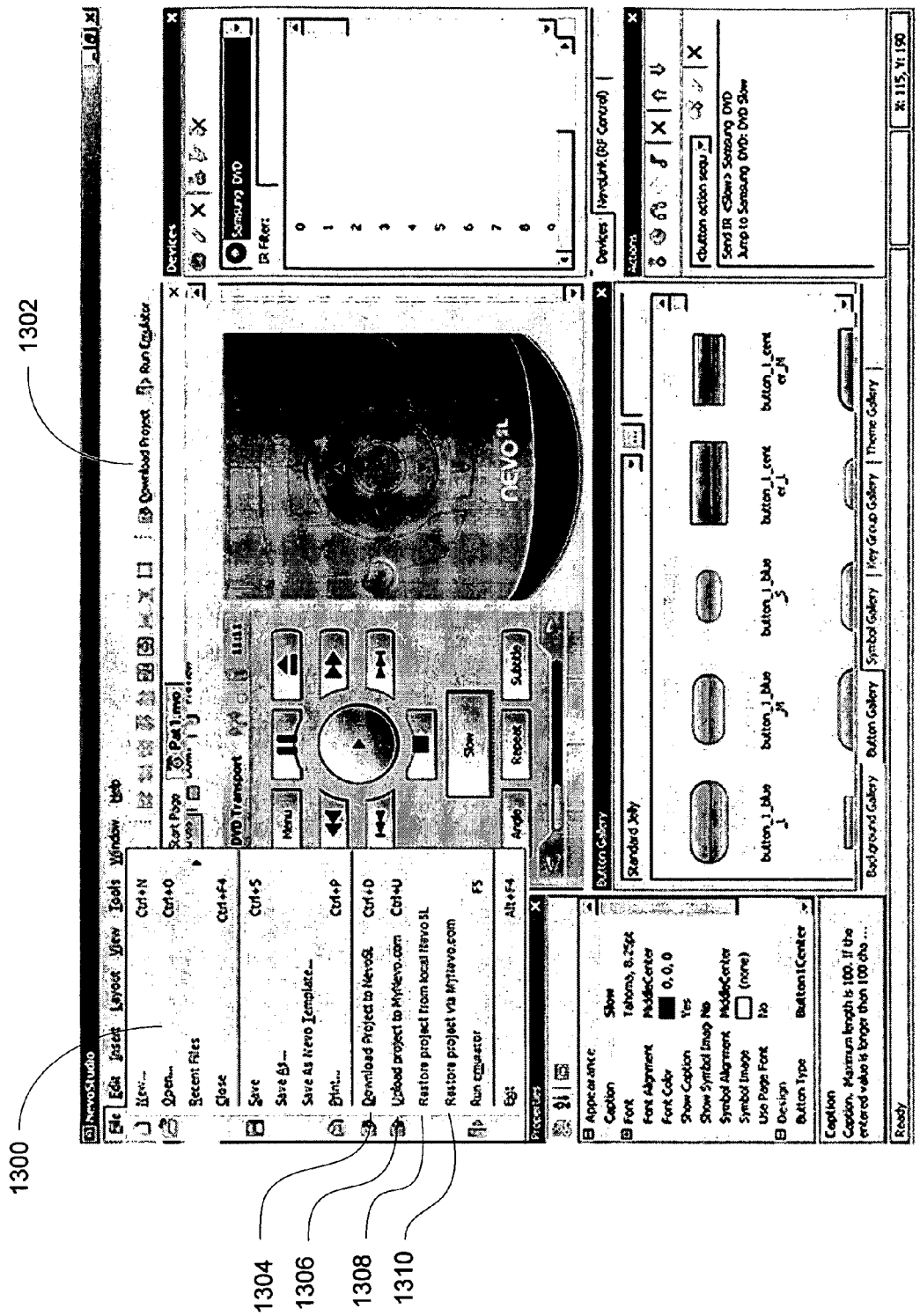
FIG. 13 illustrates an exemplary interface for downloading and uploading of project files created using the PC-based editor to and from a controlling device or a central server.

To further facilitate this configuration sharing process, server 1900 may include multiple file storage areas 1920 each assigned to a particular installer authoring system 1902 and identified by a unique installer ID which may be assigned when an installer first registers with server 1900. It will be understood that an "installer" need not be limited to the aforementioned professional but may include any party which uses the editor system and which is authorized to use, e.g., registered with, the central server system. The installer ID may also be stored by editor program 300 of system 1902 for use in populating the project identity area 1502 of project file(s) 310. Once registered, an installer may easily upload and download representations 311 of customer project files to server 1900, for example by clicking tab 1306 or 1310 of drop-down menu 1300 (FIG. 13).

Figure 22A:
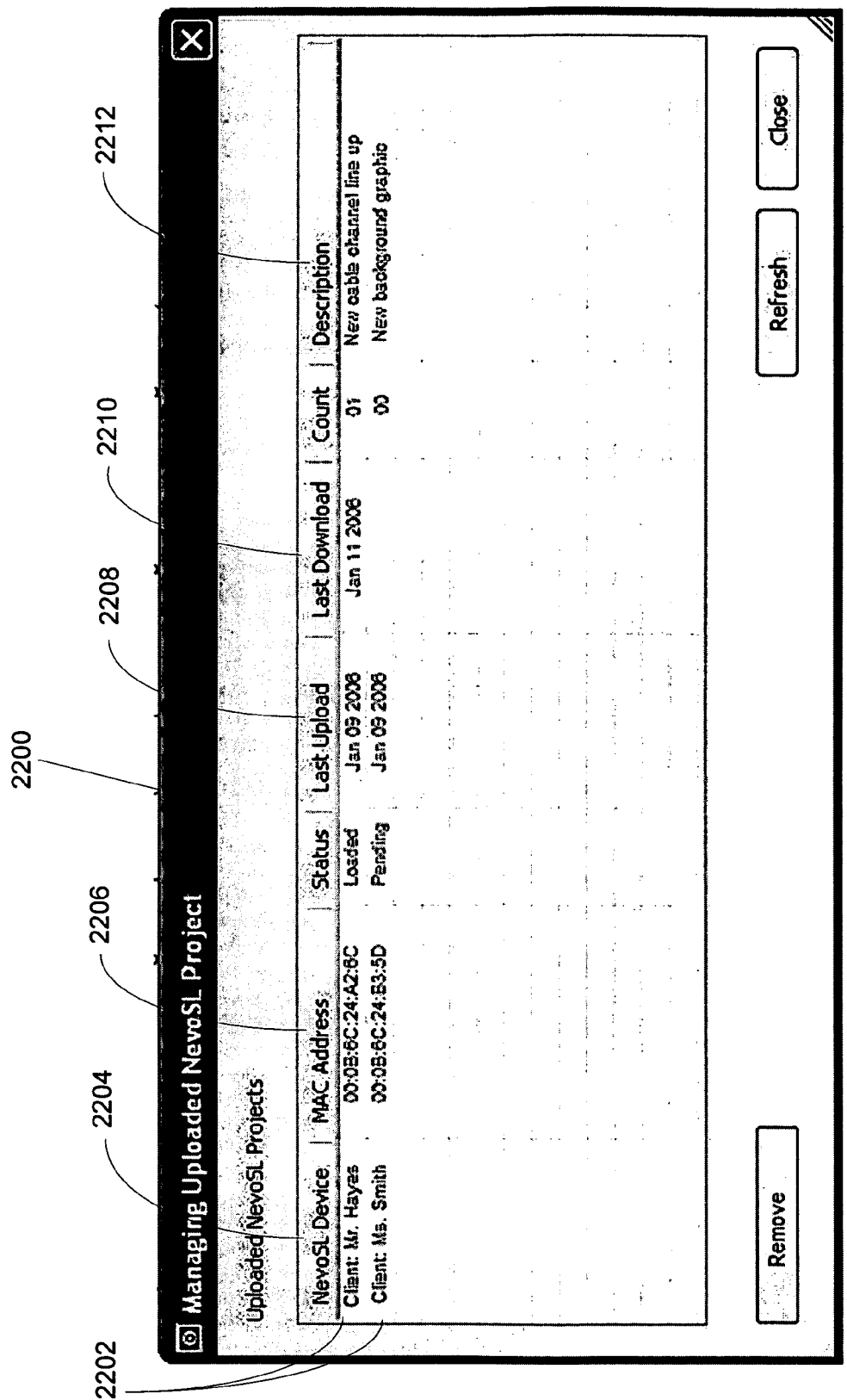
FIGS. 22a and 22b illustrate an exemplary interface used to administer project files which have been uploaded to a central server.
Figure 22B:
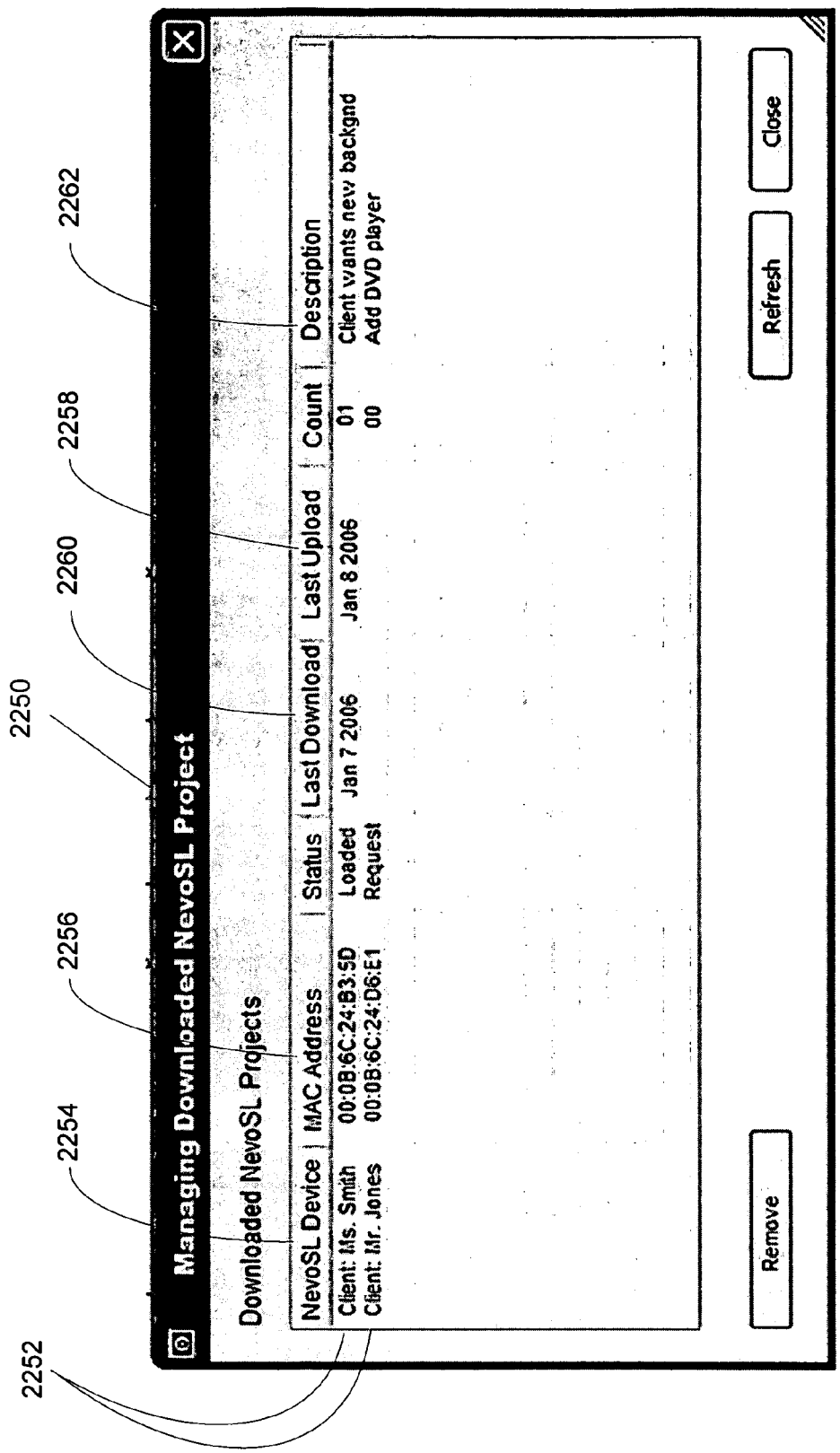

Server 1900 may also provide installers with the ability to maintain and administer their uploaded files, either in conjunction with editor program 300 or as a separate utility. Exemplary interfaces 2200 and 2250 for such a maintenance and administration function are illustrated in FIGS. 22*a* and 22*b*. In interface 2200 of FIG. 22*a*, which may be used for management of files uploaded from an editing site 1902 and destined for transfer to remotely-located controlling devices 100' or 100", each uploaded project 311 currently resident in an installer's upload area 1920 may be represented by a line entry 2202 identifying a client name 2204 and a MAC address 2206. Current status and last upload (from installer) and download (to client) dates 2208,2210 are also displayed together with an optional installer-entered descriptive annotation 2212.

In interface 2250 of FIG. 22*b*, which may be used for management of files uploaded or to be uploaded from remotely-located controlling devices 100' or 100" and destined for transfer to an editing site 1902, each uploaded configuration file or pending upload request currently resident in an installer's upload area 1920 is represented by a line entry 2252 identifying a client name 2254 and a MAC address 2256. Current status and last upload (from client) and downloaded (to installer) dates 2258,2260 are also displayed together with an optional installer-entered descriptive annotation 2262. Using such interfaces, an installer may delete, copy, update, etc. individual file entries as permitted by the server application.

Figure 20A:
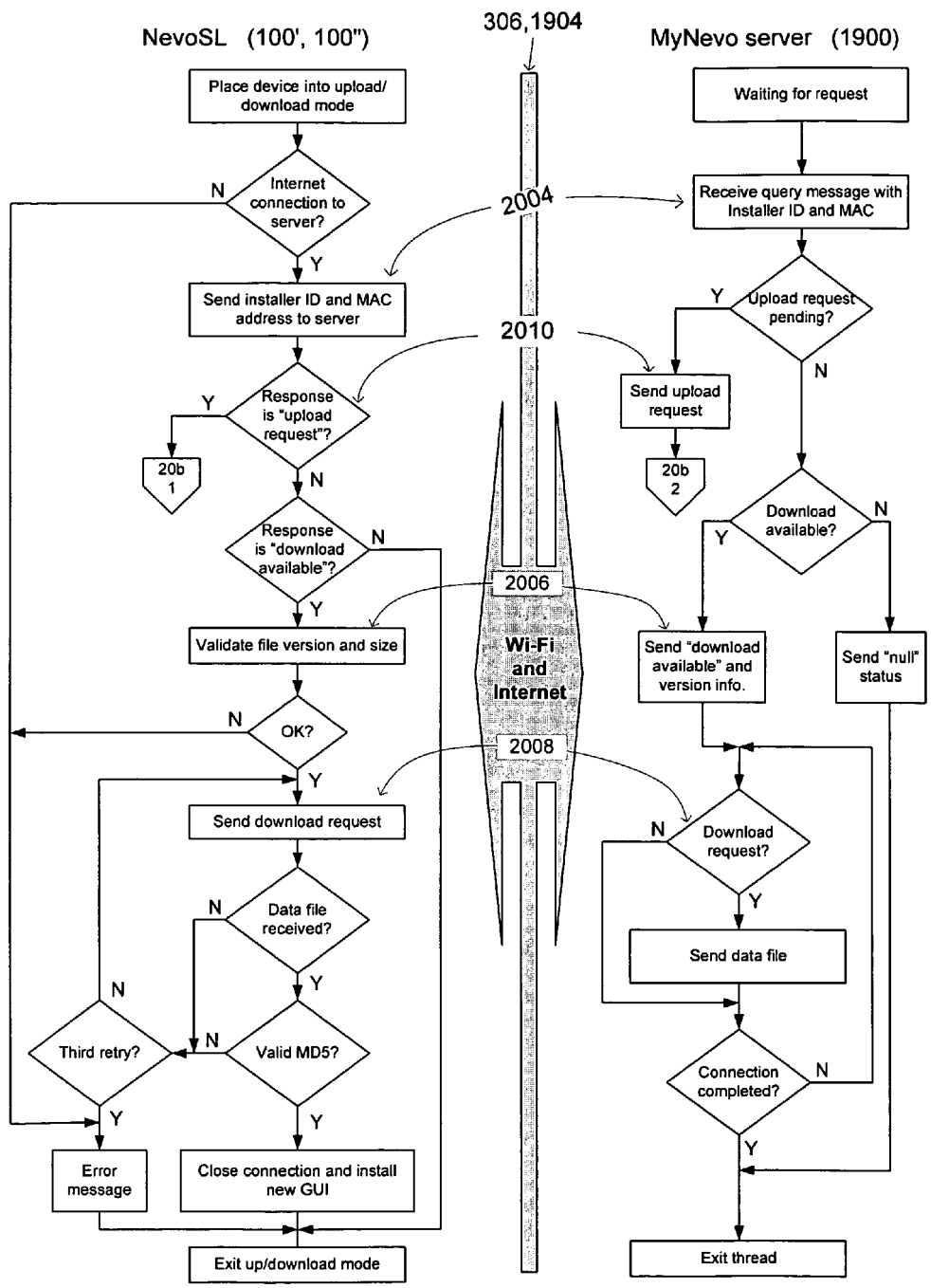
FIGS. 20a and 20b illustrate an exemplary method of uploading and downloading sharable project files between a central server and a controlling device.
Figure 20B:
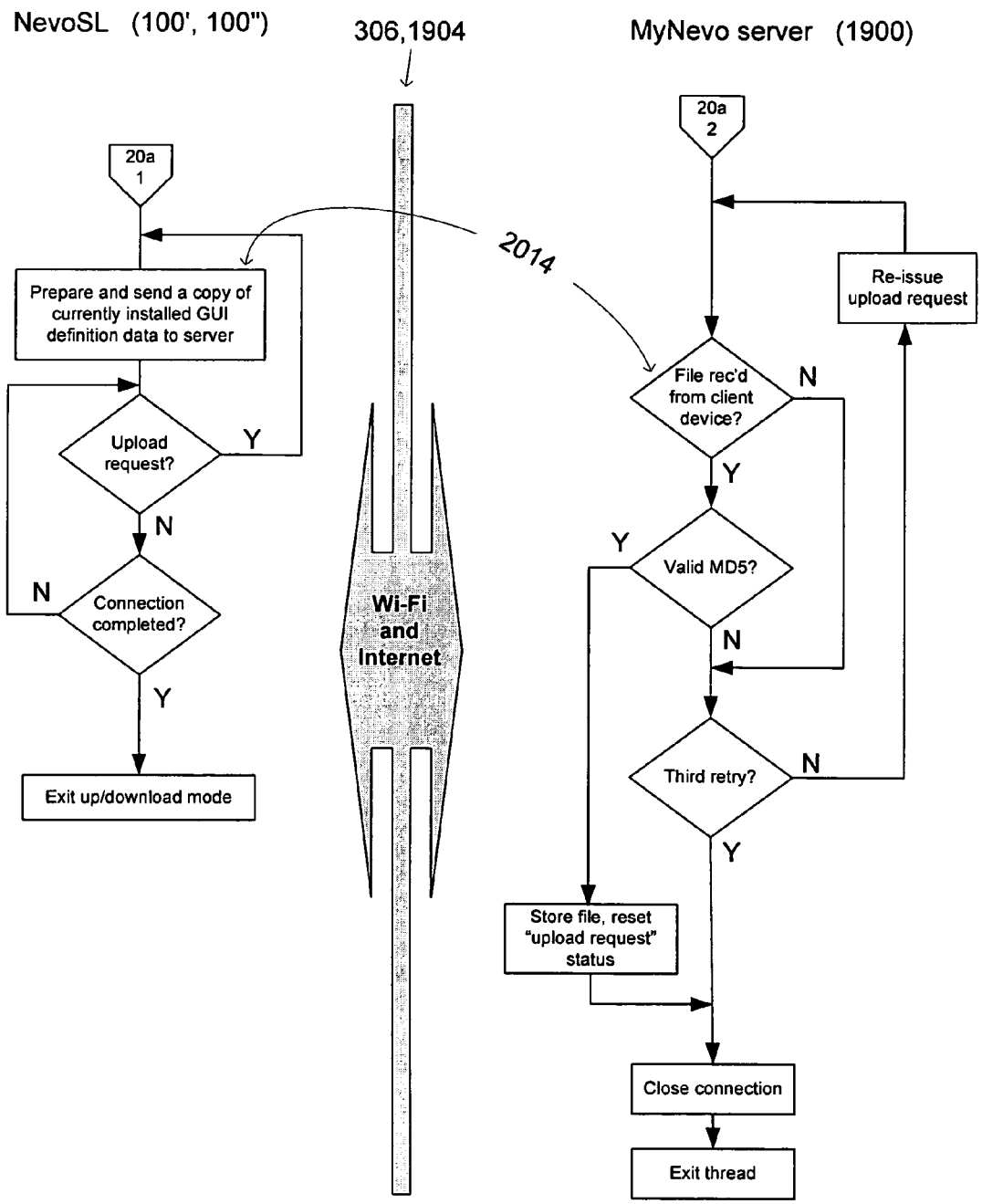

Turning now to FIGS. 20*a* and 20*b*, there is illustrated an exemplary method for exchanging such server-based configuration data with a controlling device. The controlling device may include an "Upload/Download" selection in its "Settings" menu, either in place of or in conjunction with the "Connect" selection 1800 available for local download. When "Upload/Download" is activated, provided the controlling device 100' or 100" currently has Internet access, the controlling device will prepare a unique identification value comprising an installer ID, i.e., the individual identification value assigned to the specific programmer/creator/supplier of its currently installed GUI configuration, together with the MAC (Media Access Control) address of the controlling device itself, i.e., a unique identification value specific to this one device. Such Installer IDs may for example be assigned by the operator of central file sharing service 1900 as described above, or alternatively by the manufacturer of the controlling device and/or the author of the editor program 300, while MAC address assignment is managed by the IEEE in conjunction with the various manufacturers of networked hardware devices. This information may then be forwarded 2004 over the Internet to server 1900 as a Web service request. Server 1900 may correlate these values against the origin file area and target indicia associated with uploaded (from an editing site 1902 to the server 1900) configuration data structure file(s) 311 and requests for download (to an editing site 1902 from the server 1900) in its database. If a match is found for an uploaded file 311 (i.e., an updated or modified configuration data structure file has been received from an editing site 1902), the current file version and MD5 value of the stored configuration is returned 2006 to the requesting controlling device. If the controlling device then determines that the file version is newer than the file version that is currently installed, it issues a download request 2008 to server 1900, whereafter the downloading of the new data to the controlling device proceeds in manner similar to that previously described in connection with local wireless downloading of configurations from a PC into a controlling device. If, on the other hand, an upload request is pending (i.e., an editing site 1902 has requested retrieval of configuration data from that particular device), then an upload request 2010 may be issued by the server to the device, in response to which the device may prepare and forward 2014 a copy of its current installed GUI data to server 1900 for storage in database 1920 and subsequent retrieval by editing site 1902. It will be appreciated that the GUI copy prepared for uploading by the controlling device in response to the request may be formatted in a similar manner to the downloaded configuration data structure file 311, or may alternatively be of a different format as appropriate for a particular embodiment.

While the exemplary embodiment described above makes explicit use of a file version to determine if a download and update of the controlling device is appropriate, it will be understood that various other methods may be used. For example, a particular server implementation may automatically delete data structure files 311 from its database upon successful completion of a download to a controlling device, in which case the mere presence of a file may signal that it is newly edited; an MD5 or other hash or checksum value corresponding to the controlling device's currently installed file may be compared to that of the configuration presently stored at the server and an update performed if they differ; file creation dates, upload dates, or download dates may be compared; etc. It will also be appreciated that while this process is manually initiated via a "Download" selection in the above exemplary embodiment, as an alternative it may be automatically initiated on a periodic basis, either by user option or as a standard feature. It will also be noted that during this upload and download process, in cases where the gateway device is a PC 1910, an intermediate copy 311' of the uploaded and/or downloaded data structure file may be stored on the PC 1910, on either a temporary or permanent basis. When transferring files in this manner, it will be appreciated that it may be desirable for the system, e.g., the controlling device and/or the PC, etc., to maintain a copy of the prior file version to thereby allow for the controlling device to the restored to its state prior to the upgrade. Still further, copies of prior file versions may be maintained at server 1900 for the same purpose.

It will also be appreciated that in certain embodiments the upload and or download processes for modifying the controlling device GUI or other settings may be accomplished in a real time, or substantially real time manner. By way of example, once a connection has been established between the controlling device and a remote server or PC via the Internet as described herein, the data structure file resident on the controlling device may be accessed by a software based editing tool on the remote server or PC and changes made (typically by an installer operating the software based editing tool) to the data structure file in real time as opposed to separate upload and or download procedures. Such real time changes may be effected immediately upon receipt of data sent via the software based editing tool by programming on the controlling device, or by user interaction such as initiation of a screen refresh or other operation that causes the GUI to reload. In this way changes to the GUI initiated by the installer may be effected and visible to the end user substantially in real time.

It will be appreciated that such a system would have particular utility in situations where immediate user feedback and interaction during a controlling device setup, installation, or subsequent modification procedure over a remote connection were desired.

It will be further appreciated that data uploaded from the controlling device to the server may also include data indicative of usage of the controlling device which data may be maintained by the controlling device and which data may also be used by the controlling device to further alter its configuration, e.g., used to arrange and/or populate a favorite channels page as described in co-pending published application no. 2003/0103088. In this manner, an installer may examine the controlling device usage data to, for example, discern how the user of the controlling device is interacting with the controlling device and/or appliances to thereby allow the installer to further refine a configuration to be provided to the controlling device. By way of example only, the installer may use the usage data to configure macros for the user of the controlling device if the installer discerns that key stroke sequences repeatedly appear within the usage data, may alter the GUI pages and/or GUI page links as a function of discerned GUI usage patterns, etc.

While various concepts have been described in detail, it will be appreciated by those skilled in the art that various modifications and alternatives to those concepts could be developed in light of the overall teachings of the disclosure. For example, while the embodiments presented above are described in the context of universal remote controls (i.e., controlling devices capable of commanding the operation of multiple classes of appliances devices from multiple manufacturers) as being most broadly representative of controlling devices in general, it will be appreciated that the teachings of this disclosure may be equally well applied to other controlling devices of narrower capability, and also to any general or specific purpose device requiring a visual interface (i.e., display screens, signage devices, teleprompters, etc.) without departing from the spirit and scope of the present invention. Still further, it will be appreciated that the user interfaces described herein need not be limited to controlling devices but can be utilized in connection with any device having input elements wherein it is desired to convey information concerning such input elements. For example, the user interface may be utilized with devices such as calculators, phones, appliances, etc. having input elements having associated information conveying images in the form of alphanumeric and/or symbolic labels. Further yet, while in the exemplary embodiments described above the editable GUI definition project file 310 is locally pre-processed into a controlling device compatible format 311 prior to being uploaded to central server 1900 for distribution, it will be appreciated that in alternative embodiments the original project file data 310 itself may be uploaded instead and the pre-processing step performed at the server prior to downloading to a particular controlling device. This approach may be advantageous where, for example, several models or versions of controlling device with different capabilities (e.g. graphic resolution, color palette, etc.) share a common GUI style and layout. Also, while the exemplary embodiment described uploads and downloads entire project files, it will be appreciated that other embodiments may structure these files as a series of independently updatable segments, allowing items such as, for example, favorite channel assignments or logos to be modified without necessarily downloading the rest of the device GUI and configuration settings. Such a modular approach may be advantageous where, for example, a local service provider changes a channel line up creating a requirement for multiple controlling devices to be updated and not all of them necessarily have every attribute in common. It will thus be further appreciated that any type or portion of configuration settings and/or data, including but not limited to GUI files and elements, device actions, sequences, codes, driver updates, etc, may be used without limitation in connection with the inventive concepts described herein. It will also be understood that modification, editing, or updating of such configuration settings may be performed either by a user or though any automated computing processes as are well known in the art. As such, the particular concepts disclosed are meant to be illustrative only and not limiting as to the scope of the invention which is to be given the full breadth of the appended claims and any equivalents thereof.

All documents cited within this application for patent are hereby incorporated by reference in their entirety.

What is claimed is:

1. A method for retrieving data indicative of a graphical user interface configuration of a target universal remote controlling device, comprising:

receiving at a centralized server device from a configuration editing system in communication with the centralized server device via a network an upload request for retrieving a graphical user interface configuration of the target universal remote controlling device, wherein the target universal remote controlling device is identified within the upload request;

causing the centralized server device to instruct the target universal remote controlling device to upload to the centralized server device data indicative of the graphical user interface configuration of the target universal remote controlling device in response to the target universal remote controlling device establishing contact with the centralized server device via the network at a time subsequent to the centralized server device receiving the upload request; and receiving at the centralized server device via the network the data indicative of the graphical user interface configuration of the target universal remote controlling device, modifying the data indicative of the graphical user interface configuration of the target universal remote controlling device to place the data indicative of the graphical user interface configuration of the target universal remote controlling device into a format usable by the configuration editing system, and transferring via the network the modified data indicative of the graphical user interface configuration of the target universal remote controlling device to the configuration editing system.

2. A method for retrieving data indicative of a graphical user interface configuration of a target universal remote controlling device, comprising:

receiving at a centralized server device from a configuration editing system in communication with the centralized server device via a network an unload request for retrieving a graphical user interface configuration of the target universal remote controlling device, wherein the target universal remote controlling device is identified within the upload request;

causing the centralized server device to instruct the target universal remote controlling device to upload to the centralized server device data indicative of the graphical user interface configuration of the target universal remote controlling device in response to the target universal remote controlling device establishing contact with the centralized server device via the network at a time subsequent to the centralized server device receiving the upload request;

receiving at the centralized server device via the network the data indicative of the graphical user interface configuration of the target universal remote controlling device and transferring via the network the data indicative of the graphical user interface configuration of the target universal remote controlling device to the configuration editing system; and receiving at the centralized server device from the configuration editing system via the network data indicative of an edited version of the graphical user interface configuration of the target universal remote controlling device and storing in a database associated with the centralized server device the data indicative of the edited version of the graphical user interface configuration of the target universal remote controlling device.

3. The method as recited in claim 2, comprising causing the centralized server device to download via the network from the database for use in the target universal remote controlling device the data indicative of the edited version of the graphical user interface configuration of the target universal remote controlling device in response to the target universal remote controlling device establishing contact with the centralized server device at a time subsequent to the centralized server device receiving the data indicative of the edited version of the graphical user interface configuration of the target universal remote controlling device.

4. A system for managing distribution of a controlling device configuration data, comprising:

a program for use on a first computing device to enable modification of the controlling device configuration data; and a centralized Web server in communication with the first computing device having an associated database for storing a request received from the first computing device for causing a retrieval of the controlling device configuration data from a target controlling device for provision to the first computing device via the centralized Web server and for storing data associated with a modified controlling device configuration data provided by the first computing device resulting from use of the program with the configuration data retrieved from the target controlling device;

wherein the centralized Web server further has programming which functions to allow for identification of a target for the request and an origin of and a target for the data associated with the modified controlling device configuration data stored within the database and wherein the request and the uploaded data associated with the modified controlling device configuration data is stored in an area of the database designated for use by an originator of the modified controlling device configuration data and wherein the area of the database functions to identify the origin of data associated with the modified controlling device configuration data.

* * * * *